(12) United States Patent
Price

(10) Patent No.: US 9,742,824 B2
(45) Date of Patent: *Aug. 22, 2017

(54) STREAMING MEDIA DELIVERY SYSTEM

(71) Applicant: WAG ACQUISITION, L.L.C., Flanders, NJ (US)

(72) Inventor: Harold Edward Price, Bethel Park, PA (US)

(73) Assignee: WAG ACQUISITION, L.L.C., Flanders, NJ (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/283,578

(22) Filed: Oct. 3, 2016

(65) Prior Publication Data

US 2017/0026435 A1    Jan. 26, 2017

Related U.S. Application Data

(63) Continuation of application No. 13/815,040, filed on Jan. 25, 2013, which is a continuation of application
(Continued)

(51) Int. Cl.
*G06F 15/16* (2006.01)
*H04L 29/06* (2006.01)
(Continued)

(52) U.S. Cl.
CPC .... *H04L 65/4076* (2013.01); *H04L 29/06027* (2013.01); *H04L 29/06455* (2013.01);
(Continued)

(58) Field of Classification Search
CPC . H04L 65/4076; H04L 65/80; H04L 65/4084; H04L 49/90; H04L 49/901;
(Continued)

(56) References Cited

U.S. PATENT DOCUMENTS 4,001,690 A    1/1977    Mack et al.
4,027,337 A    5/1977    de Loye et al.
(Continued)

FOREIGN PATENT DOCUMENTS

CA    2247588    1/2004
EP    0614317    9/1994
(Continued)

OTHER PUBLICATIONS

A. Periyannan; "Delivering Media Generically over RTP"; Mar. 13, 1998.
(Continued)

*Primary Examiner* — Joseph E Avellino
*Assistant Examiner* — Marshall McLeod
(74) *Attorney, Agent, or Firm* — Ernest D. Buff; Ernest D. Buff & Associates, LLC

(57) ABSTRACT

Streaming media, such as audio or video files, is sent via the Internet. The media are immediately played on a user's computer. Audio/video data is transmitted from the server under control of a transport mechanism. A server buffer is prefilled with a predetermined amount of the audio/video data. When the transport mechanism causes data to be sent to the user's computer, it is sent more rapidly than it is played out by the user system. The audio/video data in the user buffer accumulates; and interruptions in playback as well as temporary modem delays are avoided.

12 Claims, 3 Drawing Sheets

Related U.S. Application Data

No. 13/385,375, filed on Feb. 16, 2012, now Pat. No. 8,364,839, which is a continuation of application No. 12/800,177, filed on May 10, 2010, now Pat. No. 8,185,611, which is a continuation of application No. 10/893,814, filed on Jul. 19, 2004, now Pat. No. 7,716,358, which is a continuation-in-part of application No. 09/819,337, filed on Mar. 28, 2001, now Pat. No. 6,766,376.

(60) Provisional application No. 60/231,997, filed on Sep. 12, 2000.

(51) Int. Cl.
    *H04L 12/861* (2013.01)
    *H04L 12/879* (2013.01)
    *H04N 21/234* (2011.01)
    *H04N 21/238* (2011.01)
    *H04N 21/24* (2011.01)
    *H04N 21/44* (2011.01)
    *H04N 21/61* (2011.01)
    *H04N 21/647* (2011.01)

(52) U.S. Cl.
    CPC ............ *H04L 49/90* (2013.01); *H04L 49/901* (2013.01); *H04L 49/9084* (2013.01); *H04L 65/4084* (2013.01); *H04L 65/80* (2013.01); *H04L 69/16* (2013.01); *H04N 21/23406* (2013.01); *H04N 21/23805* (2013.01); *H04N 21/2407* (2013.01); *H04N 21/44004* (2013.01); *H04N 21/6125* (2013.01); *H04N 21/64776* (2013.01)

(58) Field of Classification Search
    CPC ......... H04L 49/9084; H04N 21/23406; H04N 21/23805; H04N 21/2407
    USPC .................... 709/203, 204, 217, 219, 223
    See application file for complete search history.

(56) References Cited

U.S. PATENT DOCUMENTS

| | | |
|---|---|---|
| 4,051,530 A | 9/1977 | Kuroda et al. |
| 4,606,044 A | 8/1986 | Kudo |
| 4,630,196 A | 12/1986 | Bednar, Jr. et al. |
| 4,729,020 A | 3/1988 | Schaphorst et al. |
| 4,833,535 A | 5/1989 | Ozeki et al. |
| 4,839,891 A | 6/1989 | Kobayashi et al. |
| 4,963,995 A | 10/1990 | Lang |
| 5,025,457 A | 6/1991 | Ahmed |
| 5,029,164 A | 7/1991 | Goldstein et al. |
| 5,057,932 A | 10/1991 | Lang |
| 5,065,396 A | 11/1991 | Castellano et al. |
| 5,126,845 A | 6/1992 | Yamashita |
| 5,136,655 A | 8/1992 | Bronson |
| 5,164,839 A | 11/1992 | Lang |
| 5,185,795 A | 2/1993 | Bright |
| 5,202,961 A | 4/1993 | Mills et al. |
| 5,208,810 A | 5/1993 | Park |
| 5,237,156 A | 8/1993 | Konishi et al. |
| 5,262,875 A | 11/1993 | Mincer et al. |
| 5,319,638 A | 6/1994 | Lin |
| 5,361,259 A | 11/1994 | Hunt et al. |
| 5,404,446 A | 4/1995 | Bowater et al. |
| 5,414,455 A * | 5/1995 | Hooper ............. H04N 7/17318 348/E7.071 |
| 5,428,774 A | 6/1995 | Takahashi et al. |
| 5,434,678 A | 7/1995 | Abecassis |
| 5,434,860 A | 7/1995 | Riddle |
| 5,440,334 A | 8/1995 | Walters et al. |
| 5,446,734 A | 8/1995 | Goldstein |
| 5,457,687 A | 10/1995 | Newman |
| 5,463,422 A | 10/1995 | Simpson et al. |
| 5,481,543 A | 1/1996 | Veltman |
| 5,491,565 A | 2/1996 | Naper |
| 5,491,801 A | 2/1996 | Jain et al. |
| 5,493,514 A | 2/1996 | Keith et al. |
| 5,497,404 A | 3/1996 | Grover et al. |
| 5,515,511 A | 5/1996 | Nguyen et al. |
| 5,517,672 A | 5/1996 | Reussner et al. |
| 5,521,630 A | 5/1996 | Chen et al. |
| 5,526,353 A | 6/1996 | Henley et al. |
| 5,533,021 A | 7/1996 | Branstad et al. |
| 5,541,852 A | 7/1996 | Eyuboglu et al. |
| 5,541,919 A | 7/1996 | Yong et al. |
| 5,544,170 A | 8/1996 | Kasahara |
| 5,550,982 A | 8/1996 | Long et al. |
| 5,561,637 A | 10/1996 | Dan et al. |
| 5,561,670 A | 10/1996 | Hoffert et al. |
| 5,566,175 A | 10/1996 | Davis |
| 5,574,934 A | 11/1996 | Mirashrafi et al. |
| 5,579,239 A | 11/1996 | Freeman et al. |
| 5,583,561 A | 12/1996 | Baker et al. |
| 5,583,563 A | 12/1996 | Wanderscheid et al. |
| 5,583,859 A | 12/1996 | Feldmeier |
| 5,602,831 A | 2/1997 | Gaskill |
| 5,610,841 A | 3/1997 | Tanaka et al. |
| 5,613,032 A | 3/1997 | Cruz et al. |
| 5,619,995 A | 4/1997 | Lobodzinski |
| 5,621,660 A | 4/1997 | Chaddha et al. |
| 5,623,490 A | 4/1997 | Richter et al. |
| 5,627,936 A | 5/1997 | Prasad et al. |
| 5,633,859 A | 5/1997 | Jain et al. |
| 5,644,355 A | 7/1997 | Koz et al. |
| 5,661,665 A | 8/1997 | Glass et al. |
| 5,663,951 A | 9/1997 | Danneels et al. |
| 5,664,044 A | 9/1997 | Ware |
| 5,664,116 A | 9/1997 | Gaytan et al. |
| 5,666,161 A | 9/1997 | Kohiyama et al. |
| 5,668,948 A | 9/1997 | Balknap et al. |
| 5,710,970 A | 1/1998 | Walters et al. |
| 5,719,786 A | 2/1998 | Nelson et al. |
| 5,721,815 A | 2/1998 | Ottesen |
| 5,721,878 A | 2/1998 | Ottesen et al. |
| 5,734,119 A | 3/1998 | France et al. |
| 5,737,536 A | 4/1998 | Herrmann et al. |
| 5,751,883 A | 5/1998 | Ottesen |
| 5,751,951 A | 5/1998 | Osborne et al. |
| 5,751,968 A | 5/1998 | Cohen |
| 5,758,087 A | 5/1998 | Aaker et al. |
| 5,761,417 A | 6/1998 | Henley |
| 5,768,527 A | 6/1998 | Zhu et al. |
| 5,778,374 A | 7/1998 | Dang et al. |
| 5,793,980 A | 8/1998 | Glaser et al. |
| 5,805,823 A | 9/1998 | Seitz |
| 5,809,239 A | 9/1998 | Dan et al. |
| 5,815,662 A | 9/1998 | Ong |
| 5,819,160 A | 10/1998 | Foladare et al. |
| 5,821,986 A | 10/1998 | Yuan et al. |
| 5,822,524 A * | 10/1998 | Chen .................... H04L 1/1848 348/E7.073 |
| 5,822,537 A | 10/1998 | Katseffet et al. |
| 5,828,370 A | 10/1998 | Moeller et al. |
| 5,835,495 A | 11/1998 | Ferriere |
| 5,835,667 A | 11/1998 | Wactlar et al. |
| 5,841,432 A | 11/1998 | Carmel et al. |
| 5,841,979 A | 11/1998 | Schulhof et al. |
| 5,850,481 A | 12/1998 | Rhoads |
| 5,864,682 A | 1/1999 | Porter et al. |
| 5,867,230 A | 2/1999 | Wang et al. |
| 5,867,652 A | 2/1999 | Hurvig |
| 5,874,986 A | 2/1999 | Gibbon et al. |
| 5,875,305 A | 2/1999 | Winter et al. |
| 5,881,245 A | 3/1999 | Thompson |
| 5,892,915 A | 4/1999 | Duso et al. |
| 5,910,876 A | 6/1999 | Sharma et al. |
| 5,918,002 A | 6/1999 | Klemets |
| 5,922,048 A | 7/1999 | Emura |
| 5,923,655 A | 7/1999 | Veschi et al. |
| 5,928,327 A | 7/1999 | Wang et al. |
| 5,928,330 A | 7/1999 | Goetz et al. |

(56) References Cited

U.S. PATENT DOCUMENTS

| | | |
|---|---|---|
| 5,933,603 A | 8/1999 | Vahalia et al. |
| 5,937,164 A | 8/1999 | Mages et al. |
| 5,938,734 A | 8/1999 | Yao et al. |
| 5,953,506 A | 9/1999 | Kalra et al. |
| 5,956,716 A | 9/1999 | Kenner et al. |
| 5,963,202 A | 10/1999 | Polish |
| 5,968,120 A | 10/1999 | Guedalia |
| 5,969,763 A | 10/1999 | Sakamoto |
| 5,974,503 A | 10/1999 | Venkatesh et al. |
| 5,978,567 A | 11/1999 | Rebane et al. |
| 5,987,510 A | 11/1999 | Imai et al. |
| 5,995,091 A | 11/1999 | Near et al. |
| 5,995,705 A | 11/1999 | Lang |
| 5,996,015 A | 11/1999 | Day et al. |
| 5,999,525 A | 12/1999 | Krishnaswamy et al. |
| 6,002,720 A | 12/1999 | Yurt et al. |
| 6,005,600 A | 12/1999 | Hill |
| 6,011,590 A | 1/2000 | Saukkonen |
| 6,014,693 A | 1/2000 | Ito et al. |
| 6,014,694 A | 1/2000 | Aharoni et al. |
| 6,014,706 A | 1/2000 | Cannon et al. |
| 6,018,359 A | 1/2000 | Kermode et al. |
| 6,029,194 A | 2/2000 | Tilt |
| 6,032,180 A | 2/2000 | Nishikawa |
| 6,032,189 A | 2/2000 | Jinzenji et al. |
| 6,032,193 A | 2/2000 | Sullivan |
| 6,032,197 A | 2/2000 | Birdwell et al. |
| 6,037,983 A | 3/2000 | Au et al. |
| 6,040,866 A | 3/2000 | Chen |
| 6,047,317 A | 4/2000 | Bisdikian et al. |
| 6,047,356 A | 4/2000 | Anderson et al. |
| 6,057,832 A | 5/2000 | Lev et al. |
| 6,061,731 A | 5/2000 | Blakeslee |
| 6,061,732 A | 5/2000 | Korst et al. |
| 6,065,050 A | 5/2000 | DeMoney |
| 6,067,303 A | 5/2000 | Aaker et al. |
| 6,085,221 A | 7/2000 | Graf |
| 6,085,252 A | 7/2000 | Zhu et al. |
| 6,097,422 A | 8/2000 | Aref et al. |
| 6,138,147 A | 10/2000 | Weaver et al. |
| 6,151,632 A | 11/2000 | Chaddha et al. |
| 6,151,634 A | 11/2000 | Glaser et al. |
| 6,161,137 A | 12/2000 | Ogdon et al. |
| 6,173,328 B1 | 1/2001 | Sato |
| 6,173,340 B1 | 1/2001 | Gready et al. |
| 6,181,364 B1 | 1/2001 | Ford |
| 6,192,032 B1 | 2/2001 | Izquierdo |
| 6,205,525 B1 | 3/2001 | Korst |
| 6,212,206 B1 | 4/2001 | Ketcham |
| 6,233,226 B1 | 5/2001 | Gringeri et al. |
| 6,249,551 B1 | 6/2001 | Yamaguchi |
| 6,249,810 B1 | 6/2001 | Kiraly |
| 6,263,001 B1 | 7/2001 | Banks |
| 6,269,394 B1 | 7/2001 | Kenner et al. |
| 6,275,536 B1 | 8/2001 | Chen et al. |
| 6,279,040 B1 | 8/2001 | Ma et al. |
| 6,292,834 B1 | 9/2001 | Ravi et al. |
| 6,301,258 B1 | 10/2001 | Katseff et al. |
| 6,317,416 B1 | 11/2001 | Giroux et al. |
| 6,317,795 B1 | 11/2001 | Malkin et al. |
| 6,321,269 B1 | 11/2001 | Walker |
| 6,329,986 B1 | 12/2001 | Cheng |
| 6,336,143 B1 | 1/2002 | Diedrich et al. |
| 6,347,094 B1 | 2/2002 | Gopalakrishnan |
| 6,370,272 B1 | 4/2002 | Shimizu |
| 6,377,931 B1 | 4/2002 | Shlomot |
| 6,377,995 B2 | 4/2002 | Agraharam et al. |
| 6,385,596 B1 | 5/2002 | Wiser |
| 6,385,673 B1 | 5/2002 | DeMoney |
| 6,389,473 B1 | 5/2002 | Carmel et al. |
| 6,396,907 B1 | 5/2002 | Didcock |
| 6,397,251 B1 | 5/2002 | Graf |
| 6,397,259 B1 | 5/2002 | Lincke |
| 6,405,256 B1 | 6/2002 | Lin et al. |
| 6,408,128 B1 | 6/2002 | Abecassis |
| 6,430,620 B1 | 8/2002 | Omura et al. |
| 6,438,123 B1 | 8/2002 | Chapman |
| 6,438,630 B1 | 8/2002 | DeMoney |
| 6,449,719 B1 | 9/2002 | Baker |
| 6,452,943 B1 | 9/2002 | Furuya |
| 6,487,663 B1 | 11/2002 | Jaisimha et al. |
| 6,502,139 B1 | 12/2002 | Birk et al. |
| 6,502,194 B1 | 12/2002 | Berman et al. |
| 6,535,920 B1 | 3/2003 | Parry et al. |
| 6,536,043 B1 | 3/2003 | Guedalia |
| 6,549,942 B1 | 4/2003 | Janky et al. |
| 6,557,031 B1 | 4/2003 | Mimura et al. |
| 6,574,218 B1 | 6/2003 | Cooklev |
| 6,588,015 B1 | 7/2003 | Eyer et al. |
| 6,594,699 B1 | 7/2003 | Sahai et al. |
| 6,598,228 B2 | 7/2003 | Hejna, Jr. |
| 6,621,870 B1 | 9/2003 | Gordon et al. |
| 6,625,656 B2 | 9/2003 | Goldhor et al. |
| 6,625,750 B1 | 9/2003 | Duso et al. |
| 6,637,031 B1 | 10/2003 | Chou |
| 6,665,751 B1 | 12/2003 | Chen et al. |
| 6,675,241 B1 | 1/2004 | Hunter |
| 6,700,893 B1 | 3/2004 | Radha et al. |
| 6,708,213 B1 | 3/2004 | Bommaiah et al. |
| 6,711,741 B2 | 3/2004 | Yeo |
| 6,715,007 B1 | 3/2004 | Williams et al. |
| 6,715,126 B1 | 3/2004 | Chang et al. |
| 6,728,753 B1 | 4/2004 | Parasnis |
| 6,738,380 B1 | 5/2004 | Imai et al. |
| 6,741,290 B1 | 5/2004 | Wells |
| 6,757,273 B1 | 6/2004 | Hsu et al. |
| 6,757,796 B1 | 6/2004 | Hofmann |
| 6,763,178 B1 | 7/2004 | Suzuki et al. |
| 6,763,392 B1 | 7/2004 | del Val |
| 6,778,499 B1 | 8/2004 | Senarath et al. |
| 6,788,686 B1 | 9/2004 | Khotimsky et al. |
| 6,792,468 B1 | 9/2004 | Bloch et al. |
| 6,806,909 B1 | 10/2004 | Radha et al. |
| 6,829,368 B2 | 12/2004 | Meyer et al. |
| 6,831,892 B2 | 12/2004 | Robinett et al. |
| 6,845,398 B1 | 1/2005 | Galensky et al. |
| 6,847,618 B2 | 1/2005 | Laursen et al. |
| 6,850,965 B2 | 2/2005 | Allen |
| 6,859,557 B1 | 2/2005 | Uyttendaele et al. |
| 6,879,559 B1 | 4/2005 | Blackmon et al. |
| 6,879,634 B1 | 4/2005 | Oz et al. |
| 6,888,848 B2 | 5/2005 | Beshai et al. |
| 6,889,257 B1 | 5/2005 | Patel |
| 6,907,481 B2 | 6/2005 | Kovacevic |
| 6,925,495 B2 | 8/2005 | Hegde et al. |
| 6,938,047 B2 | 8/2005 | Kryeziu |
| 6,978,306 B2 | 12/2005 | Miller et al. |
| 6,981,050 B1 | 12/2005 | Tobias |
| 6,985,932 B1 | 1/2006 | Glaser et al. |
| 6,988,144 B1 | 1/2006 | Luken et al. |
| 6,990,497 B2 | 1/2006 | O'Rourke et al. |
| 6,992,983 B1 | 1/2006 | Chatterjee |
| 6,993,787 B1 | 1/2006 | Kamel et al. |
| 7,016,970 B2 | 3/2006 | Harumoto et al. |
| 7,020,710 B2 | 3/2006 | Weber et al. |
| 7,035,287 B2 | 4/2006 | Tourunen et al. |
| 7,039,784 B1 | 5/2006 | Chen et al. |
| 7,046,672 B2 | 5/2006 | Liao et al. |
| 7,054,500 B1 | 5/2006 | Lillevold |
| 7,058,721 B1 | 6/2006 | Ellison et al. |
| 7,058,728 B1 | 6/2006 | Eklund |
| 7,061,936 B1 | 6/2006 | Yoshimura et al. |
| 7,065,342 B1 | 6/2006 | Rolf |
| 7,085,842 B2 | 8/2006 | Reid et al. |
| 7,111,058 B1 | 9/2006 | Nguyen et al. |
| 7,111,162 B1 | 9/2006 | Bagepalli et al. |
| 7,111,316 B1 | 9/2006 | Zahorjan et al. |
| 7,113,983 B1 | 9/2006 | Terada et al. |
| 7,127,735 B1 | 10/2006 | Lee et al. |
| 7,136,377 B1 | 11/2006 | Tweedly et al. |
| 7,143,177 B1 | 11/2006 | Johnson et al. |
| 7,149,811 B2 | 12/2006 | Wise et al. |
| 7,154,895 B1 | 12/2006 | Bornemisza et al. |
| 7,158,518 B2 | 1/2007 | Burmeister et al. |

(56) References Cited

U.S. PATENT DOCUMENTS

| | | |
|---|---|---|
| 7,161,939 B2 | 1/2007 | Israel et al. |
| 7,167,560 B2 | 1/2007 | Yu |
| 7,170,856 B1 | 1/2007 | Ho et al. |
| 7,187,947 B1 | 3/2007 | White |
| 7,209,437 B1 * | 4/2007 | Hodgkinson ........... H04L 29/06 370/230 |
| 7,212,574 B2 | 5/2007 | Abrams, Jr. et al. |
| 7,224,703 B2 | 5/2007 | Antal et al. |
| 7,237,254 B1 * | 6/2007 | Omoigui ........... H04N 7/17318 348/E7.071 |
| 7,239,703 B2 | 7/2007 | Higurashi et al. |
| 7,249,264 B2 | 7/2007 | Belknap et al. |
| 7,260,564 B1 | 8/2007 | Lynn et al. |
| 7,266,118 B2 | 9/2007 | Ido et al. |
| 7,272,298 B1 | 9/2007 | Lang et al. |
| 7,272,658 B1 | 9/2007 | Edelman et al. |
| 7,287,083 B1 | 10/2007 | Nay et al. |
| 7,298,849 B2 | 11/2007 | Graunke |
| 7,302,396 B1 | 11/2007 | Cooke |
| 7,310,678 B2 | 12/2007 | Gunaseelan et al. |
| 7,318,017 B2 | 1/2008 | Swoboda |
| 7,330,902 B1 | 2/2008 | Bergenwall et al. |
| 7,334,016 B2 | 2/2008 | Fishhaut et al. |
| 7,334,044 B1 | 2/2008 | Allen |
| 7,346,698 B2 | 3/2008 | Hannaway |
| 7,349,663 B1 | 3/2008 | Joseph |
| 7,373,413 B1 | 5/2008 | Nguyen et al. |
| 7,376,710 B1 | 5/2008 | Cromwell et al. |
| 7,398,312 B1 | 7/2008 | Guo et al. |
| 7,406,176 B2 | 7/2008 | Zhu et al. |
| 7,424,730 B2 | 9/2008 | Chou |
| 7,434,052 B1 | 10/2008 | Rump |
| 7,448,062 B1 | 11/2008 | Bloch et al. |
| 7,471,834 B2 | 12/2008 | Sull et al. |
| 7,478,164 B1 | 1/2009 | Lango et al. |
| 7,496,676 B2 | 2/2009 | Kryeziu |
| 7,499,545 B1 | 3/2009 | Bagshaw |
| 7,561,602 B1 | 7/2009 | Nakabayashi |
| 7,570,766 B2 | 8/2009 | Mangold et al. |
| 7,583,695 B2 | 9/2009 | Vimpari et al. |
| 7,584,291 B2 | 9/2009 | McDowall et al. |
| 7,587,509 B1 | 9/2009 | Edelman et al. |
| 7,590,237 B2 | 9/2009 | Krause et al. |
| 7,590,656 B2 | 9/2009 | Plastina et al. |
| 7,594,110 B2 | 9/2009 | Carr |
| 7,647,297 B2 | 1/2010 | LaChapelle et al. |
| 7,681,227 B2 | 3/2010 | Zwart et al. |
| 7,689,510 B2 | 3/2010 | Lamkin et al. |
| 7,769,168 B2 | 8/2010 | Zhu et al. |
| 7,818,444 B2 | 10/2010 | Brueck et al. |
| 7,836,124 B2 | 11/2010 | Saxena et al. |
| 7,839,998 B2 | 11/2010 | Candelore et al. |
| 7,848,520 B2 | 12/2010 | Candelore et al. |
| 7,890,631 B2 | 2/2011 | Allen |
| 7,913,282 B2 | 3/2011 | Ishikawa et al. |
| 7,917,557 B2 | 3/2011 | Shteyn et al. |
| 7,975,060 B2 | 7/2011 | Monro |
| 7,975,280 B2 | 7/2011 | Bertram |
| 8,156,236 B2 | 4/2012 | Costanzo et al. |
| 8,191,097 B1 | 5/2012 | Armstrong et al. |
| 2001/0047377 A1 | 11/2001 | Sincaglia et al. |
| 2002/0007418 A1 | 1/2002 | Hegde et al. |
| 2002/0013948 A1 | 1/2002 | Aguayo, Jr. et al. |
| 2002/0021761 A1 | 2/2002 | Zhang et al. |
| 2002/0023165 A1 | 2/2002 | Lahr |
| 2002/0025045 A1 | 2/2002 | Raike |
| 2002/0029166 A1 | 3/2002 | Jacobs et al. |
| 2002/0052967 A1 | 5/2002 | Goldhor et al. |
| 2002/0069218 A1 | 6/2002 | Sull et al. |
| 2002/0078174 A1 | 6/2002 | Sim et al. |
| 2002/0083182 A1 | 6/2002 | Alvarado et al. |
| 2002/0120675 A1 | 8/2002 | Everett et al. |
| 2002/0131443 A1 | 9/2002 | Robinett |
| 2002/0147634 A1 | 10/2002 | Jacoby et al. |
| 2002/0177914 A1 | 11/2002 | Chase |
| 2003/0014488 A1 | 1/2003 | Dalal et al. |
| 2003/0018978 A1 | 1/2003 | Singal et al. |
| 2003/0061305 A1 | 3/2003 | Copley et al. |
| 2003/0068046 A1 | 4/2003 | Lindqvist et al. |
| 2003/0093790 A1 | 5/2003 | Logan et al. |
| 2003/0186645 A1 | 10/2003 | Mori |
| 2004/0049793 A1 | 3/2004 | Chou |
| 2004/0078812 A1 | 4/2004 | Calvert |
| 2004/0086120 A1 | 5/2004 | Akins, III et al. |
| 2004/0123725 A1 | 7/2004 | Kim |
| 2004/0131340 A1 | 7/2004 | Antoun et al. |
| 2004/0162910 A1 | 8/2004 | Kryeziu |
| 2004/0186733 A1 | 9/2004 | Loomis et al. |
| 2004/0231004 A1 | 11/2004 | Seo |
| 2004/0260835 A1 | 12/2004 | Welk et al. |
| 2005/0005025 A1 | 1/2005 | Harville et al. |
| 2005/0080876 A1 | 4/2005 | Peiffer et al. |
| 2005/0108320 A1 | 5/2005 | Lord et al. |
| 2005/0188007 A1 | 8/2005 | Warner et al. |
| 2005/0190915 A1 | 9/2005 | Pare et al. |
| 2005/0203917 A1 | 9/2005 | Freeberg et al. |
| 2005/0251832 A1 | 11/2005 | Chiueh |
| 2005/0262251 A1 | 11/2005 | Klemets et al. |
| 2006/0095472 A1 | 5/2006 | Krikorian et al. |
| 2006/0136875 A1 | 6/2006 | Thorpe |
| 2006/0143667 A1 | 6/2006 | Kurosawa |
| 2006/0153537 A1 | 7/2006 | Kaneko et al. |
| 2006/0174134 A1 | 8/2006 | Taylor |
| 2006/0195886 A1 | 8/2006 | Ashley |
| 2007/0005428 A1 | 1/2007 | Jacobs et al. |
| 2007/0005795 A1 | 1/2007 | Gonzalez |
| 2007/0016865 A1 | 1/2007 | Johnson et al. |
| 2007/0038728 A1 | 2/2007 | Jacobs et al. |
| 2007/0079327 A1 | 4/2007 | Khoo et al. |
| 2007/0088804 A1 | 4/2007 | Qureshey et al. |
| 2007/0226365 A1 | 9/2007 | Hildreth et al. |
| 2007/0233784 A1 | 10/2007 | O'Rourke et al. |
| 2007/0274672 A1 | 11/2007 | Itoi |
| 2008/0059532 A1 | 3/2008 | Kazmi et al. |
| 2008/0133701 A1 | 6/2008 | Kazmi et al. |
| 2008/0195743 A1 | 8/2008 | Brueck et al. |

FOREIGN PATENT DOCUMENTS

| | | |
|---|---|---|
| EP | 0680185 | 11/1995 |
| EP | 0720374 | 7/1996 |
| EP | 0762300 | 3/1997 |
| EP | 0817017 | 1/1998 |
| EP | 820204 A2 | 1/1998 |
| EP | 0827336 | 3/1998 |
| EP | 0859535 | 8/1998 |
| EP | 0895420 | 2/1999 |
| EP | 0984584 A1 | 3/2000 |
| EP | 1395005 | 3/2004 |
| EP | 1418756 | 5/2004 |
| EP | 1427218 | 6/2004 |
| EP | 1113642 | 7/2004 |
| EP | 1437866 | 7/2004 |
| EP | 1487147 | 12/2006 |
| FR | 2732180 | 9/1996 |
| JP | H09298734 | 11/1997 |
| JP | H10108157 | 4/1998 |
| JP | H10336626 | 12/1998 |
| JP | 11184780 | 7/1999 |
| JP | H11184780 | 7/1999 |
| JP | H11187367 | 7/1999 |
| JP | H11295589 | 10/1999 |
| JP | 20-00151595 | 5/2000 |
| JP | 20-00165844 | 6/2000 |
| JP | 20-00172599 | 6/2000 |
| JP | 20-00228669 | 8/2000 |
| JP | 20-03163916 | 6/2003 |
| JP | 2003179906 | 6/2003 |
| KR | 100244854 | 2/2000 |
| KR | 100253230 | 4/2000 |
| WO | WO-9712447 | 4/1997 |
| WO | WO-9717775 | 5/1997 |
| WO | WO-9717776 | 5/1997 |
| WO | WO-9722201 | 6/1997 |

(56) References Cited

FOREIGN PATENT DOCUMENTS

| WO | WO-97/30551 | 8/1997 |
|---|---|---|
| WO | WO-9730551 | 8/1997 |
| WO | WO-97/41504 | 11/1997 |
| WO | WO-9741504 | 11/1997 |
| WO | WO-97/44942 | 12/1997 |
| WO | 9844733 A1 | 10/1998 |
| WO | WO-9847733 | 10/1998 |
| WO | WO-9849634 | 11/1998 |
| WO | WO-9922477 | 5/1999 |
| WO | WO-0020974 | 4/2000 |
| WO | WO-0022795 | 4/2000 |
| WO | WO-0048100 | 8/2000 |
| WO | WO-0138984 | 5/2001 |
| WO | WO-0138993 | 5/2001 |
| WO | WO-0180558 | 10/2001 |
| WO | WO-02057943 | 7/2002 |
| WO | WO-03023781 | 3/2003 |
| WO | WO-2004039034 | 5/2004 |
| WO | WO-2005004485 A1 | 1/2005 |

OTHER PUBLICATIONS

"Macromedia delivers macromedia flash communication server MX"; Jul. 9, 2002.
Ahmed Bashandy; "Jitter Control and Dynamic Resource Management for Multimedia Communication Over Broadband Network," ECE Technical Reports, Electrical and Computer Engineering; Jun. 1, 1998.
Alan Jones; "Handling Audio and Video Streams in a Distributed Environment"; Apr. 1993.
Mark Allman et al.; TCP Congestion Control, Standards Track ; RFC2581; ; Apr. 1999.
Elan Amir et al.; An Application Level Video Gateway, ACM Multimedia 95—Electronic Proceedings; Nov. 1995.
Amitabha Das; "A Model for Synchronisation and Communication of Distributed Muitimedia Data Streams," IEEE Catalogue No. 95TH8061; 1995.
Andrew S. Tanenbaum; Computer Networks, Third Edition—Chapter 6; 1996.
Andy Hopper; "Pandora—an experimental system for multimedia applications"; Jan. 1990.
Anup Rao; "Real Time Streaming Protocol." 1996; 1996.
ARRL Amateur Radio; "10th Computer Networking Conference"; Sep. 1991.
ARRL Amateur Radio; "Computer Networking Conference 1-4"; 1981-1985.
ARRL Amateur Radio; "5th Computer Networking Conference"; Mar. 9, 1986.
ARRL Amateur Radio; "6th Computer Networking Conference"; Aug. 29, 1987.
ARRL Amateur Radio; "7th Computer Networking Conference"; Oct. 1, 1988.
ARRL Amateur Radio; "8th Computer Networking Conference"; Oct. 7, 1989.
ARRL/CRRL Amateur Radio; "9th Computer Networking Conference"; Sep. 22, 1990.
Asit Dan; "A Dynamic Policy of Segment Replication for Load-Balancing in Video-on-Demand Servers," Multimedia Systems; 1995.
Berners Lee, "Hypertext Transfer Protocol 1.0," May 1996.
Bing Zheng and Mohammed Atiquzzaman; "Traffic Management of Multimedia over ATM Networks"; Jan. 1999.
Bing, Zheng; Multimedia Over Highspeed; Networks: Reducing Network; Requirements With Fast Buffer; Fillup; ; 1998.
Bob Breedlove et al.; Web Programming Unleashed.
Boll, Susanne et al.; Intelligent Prefetching and Buffering for Interactive Streaming of MPEG Videos, Ulmer Informatikberichte Nr. 2000-05; Apr. 1, 2000.
Brett Atwood; "Video Netcasting is Making Strides Online"; Mar. 2, 1996.
"America Online Chooses VDOLive; Showcasing Internet Video and to be Available to All AOL Members" Bloomberg Law; Mar. 13, 1997.
C. Zhu; "RTP Payload Format for H. 263 Video Stream," Standards Track, RFC2190; Sep. 1997.
Chen, Zhigang et al.; Real Time Video and Audio in the World Wide Web, World Wide Web Journal; 1995.
Christophe Diot and Inria Sophia Antipolis; "Adaptive Applications and QoS Guaranties," Proc. of the International Conference on Multimedia and Networking; 1995.
Christopher Hess; "Media Streaming Protocol : An Adaptive Protocol for the Delivery of Audio and Video Over the Internet"; 1998.
Christopher Yavelow; Music & Sound Bible, IDG Books Worldwide, Inc.
Chung-Ming Huang and Ruey-Yang Lee; "Multimedia Synchronization for Live Presentation Using the N-Buffer Approach"; 1995.
Chung-Ming Huang et al.; "PARK: A Paused- and-Run K-Stream Multimedia Synchronization Control Scheme"; Apr. 2000.
D. Hoffman et al.; "RTP Payload for MPEG1/MPEG2 Video," Standards Track, RFC 2250; Jan. 1998.
Dan Frankowski and John Riedl; "Hiding Jitter in an Audio Stream"; Jun. 18, 1993.
Jehan-Francois Paris et al.; "A Hybrid Broadcasting Protocol for Video on Demand"; 1999.
Jehan-Francois Paris and Darrell D.E. Long; "A Proactive Implementation of Interactive Video-on-Demand"; 2003.
Jehan-Francois Paris et al.; "A Reactive Broadcasting Protocol for Video on Demand"; 1999.
Darrell D.E. Long; "A variable bandwidth broadcasting protocol for video-on-demand."
Jehan-Francois Paris et al.; "A Zero-delay Broadcasting Protocol for Video on Demand"; 1999.
Chane L. Fullmer et al.; "Adding Adaptive Flow Control to Swift/RAID": Jan. 12, 1995.
Jehan-Francois Paris et al.; "Combining Pay-Per-View and Video-on-Demand Services"; 1999.
Jehan-Francois Paris et al.; "Efficient Broadcasting Protocols for Video on Demand"; 1998.
Luis-Felipe Cabrera; "Exploiting Multiple I/O Streams to Provide High Data-Rates"; 1991.
Steven W. Carter and Darrell D.E. Long; "Improving Bandwidth Efficiency of Video-On-Demand Servers"; 1999.
Steven W. Carter and Darrell D.E. Long; "Improving Video-on-Demand Server Efficiency Through Stream Tapping"; 1997.
Cheng Tang et al.; "Performance Guarantees on ATM Networks"; 1994.
Darrell D.E. Long et al.; "Providing Performance Guarantees in an FDDI Network"; 1993.
Darrell D.E. Long and Madhukar N. Thakur; "Scheduling Real-Time Disk Transfers for Continuous Media Applications"; 1993.
Luis-Felipe Cabrera and Darrell D.E. Long; "Swift: A Distributed Storage Architecture for Large Objects"; 1991.
Karthik Thirumalai et al.; "Tabbycat—an Inexpensive Scalable Server for Video-on-Demand"; 2003.
David Greaves and Mark Taunton; "ATM for Video and Audio on Demand." AES UK Audio for New Media Conference, UK 11th Conference: Audio for New Media (ANM); Mar. 1996.
David P . Anderson and George Homsy; "A Continuous Media I/O Server and Its Synchronization Mechanism," University of California at Berkeley, pub. IEEE 1991; Oct. 1991.
Kamran Ahsan and Deepa Kundur; "Practical Data Hiding in TCP/IP"; 2002.
Department of Defense Interface Standard—Tactical Communications Protocol 2 (TACO2) for the National Imagery Transmission Format Standard; Jun. 18, 1993.
Derek Eager et al.; "Bandwidth Skimming: A Technique for Cost-Effective Video-on-Demand"; 2000.
Dijiang Huang et al.; "A Double Authentication Scheme to Detect Impersonation Attack in Link State Routing Protocols"; 2003.
Domenico Ferrari; "Distributed Delay Jitter Control in Packet-Switching Internetworks," The Tenet Group University of California at Berkeley and International Computer Science Institute; Oct. 1991.

(56) References Cited

OTHER PUBLICATIONS

Dong-Hoon Nam and Seung-Kyu Park; "Adaptive Multimedia Stream Presentation in Mobile Computing Environment," IEEE TENCON; Sep. 1999.
Dwight Makaroff; "Design, Implementation and Analysis of a Variable Bit-Rate Continuous Media File Server"; 1987.
E. Chaput et al.; "Hypermedia Synchronization over Asynchronous Networks," Modeling Multimedia Information and Systems; Nov. 1997.
Edward Chang and Hector Garcia-Molina; "Reducing Initial Latency in a Multimedia Storage System"; 1996.
Eric Fleischman; "Internet Draft, Advanced Streaming Format (ASF) Specification," Microsoft Corporation; Jan. 9, 1998.
Eric Fleischman and Anders Klemets; "Recording MBone Sessions to ASF Files," Microsoft Corporation; Nov. 14, 1997.
Fabio Kon et al.; "A Component-Based Architecture for Scalable Distributed Multimedia"; 1998.
Francis Rumsey; Digital Audio Operations, Butterworth-Heinemann Ltd.; 1991.
Francis Rumsey; Digital Interface Handbook, Third Edition; 2004.
French, Kenneth et al.; "SRP—A Multimedia Network Protocol," Worcester Polytechnic Institute; May 15, 2000.
Gary Hoo; "An Mbone Recorder/Player"; Dec. 1997.
Gerald Neufeld et al.; "Design of a Variable Bit Rate Continuous Media File Server for an ATM Network"; 1996.
Gianarlo Fortino and Libero Nigro; "ViCRO: An Interactive and Cooperative VideoRecording on-demand System over Mbone"; Mar. 1999.
Giuseppe Bianchi; "Buffer sizing for high speed video information retrieval on ATM networks," GLOBECOM—New York—vol. 2, pp. 1057-1061; 1997.
Guido Nerjes et al.; "Stochastic Performance Guarantees for Mixed Workloads in a Multimedia Information System"; 1997.
H. Schulzrinne et al.; "RTP: A Transport Protocol for Real-Time Applications," Standards Track, RFC 3550; Jul. 2003.
Eiji Kawaguchi et al., "A Model of Anonymous Covert Mailing System Using Steganographic Scheme," 2003.
H. Schulzrinne et al.; "Real Time Streaming Protocol (RTSP)," Standards Track, RFC2326; Apr. 1998.
H. Schulzrinne et al.; "RTP: A Transport Protocol for Real-Time Applications," Standard Track, RFC 1889; Jan. 1996.
Hang Liu; "Adaptive source rate control for real-time wireless video transmission," Mobile Networks and Applications 3: 1998.
Hasegawa, Teruyuki; Applying Reliable Data Transfer; Protocol to Real Time Video; Retrieval System; ; Oct. 1997.
Herng-Yow Chen et al.; "A Novel Multimedia Synchronization Model and Its Applications in Multimedia Systems," IEEE Transactions on Consumer Electronics, vol. 41, No. 1; Feb. 1995.
Hess, Christopher; Media Streaming Protocol : An; Adaptive Protocol for the; Delivery of Audio and Video; Over the Internet; ; 1998.
Hollfelder, Silvia et al.; A Client-Controlled Adaptation Framework for Multimedia Database Systems, IDMS '97 Proceedings of the 4th International Workshop on Interactive Distributed Multimedia Svstems and Telecommunication Services; 1997.
Hollfelder, Silvia; Admission Control for Multimedia Applications in Client-Pull Architectures, In Proc. of the Int. Workshop on Multimedia Information Systems (MIS), Como, Italy; Sep. 1997.
Hollfelder, Silvia, et al.; Data Abstractions for Multimedia Database Systems, Arbeitspapiere der GMD, GMD Technical Report No. 1075; May 1997.
Hui, Joseph et al.; Client-Server Synchronization and Buffering for Variable Rate Multimedia Retrievals, IEEE Journal on Selected Areas in Communications, vol. 14, No. 1; Jan. 1996.
J. C. Bolot and T. Turletti; "Experience with Control Mechanisms for packet video in the Internet"; 1998.
J. Rexford; "Online Smoothing of Live, Variable-Bit-Rate Video": 1997.
J.P. Martin-Flatin; "Push vs. Pull in Web-Based Network Management"; 1999.

Jae-Gon Kim et al.; "Design and Implementation of an MPEG-2 Transport Stream Multiplexer for HDTV Satellite Broadcasting," IEEE Transactions on Consumer Electronics, vol. 44, No. 3; Aug. 1998.
James C. Yee and Kathleen Nichols: "Server and Buffer Allocation in Client Server Multimedia System," IEEE; 1993.
James D. Salehi et al.; "Supporting Stored Video: Reducing Rate Variability and End-to-End Resource Requirements through Optimal Smoothing," IEEE/ACM Transactions on Networking, vol. 6, Issue 4, pp. 397-410; Aug. 1998.
Jane Hunter et al.; "A Review of Video Streaming Over Internet," Technical report DSTC TR97-10; Aug. 1997.
Jeffrey Ward; "Design, Implementation and In-orbit Demonstration of a Store-AndForward Digital Communication system for Low Earth Orbit Microsatellites"; Dec. 1993.
Jennifer Rexford and Don Towsley; "Smoothing Variable-Bit-Rate Video in an Internetwork," IEEE/ACM Transactions on Networking, vol. 7, issue 2, p. 202-215; Apr. 1999.
Jin Jing et al.; "Client-Server Computing in Mobile Environments"; Jun. 1999.
Thomas Vinod Johnson, et al.; Dynamic Playout Scheduling Algorithms for Continuous Multimedia Streams, Multimedia Systems 7:312-325; 1999.
Jon Crowcroft; "Internetworking Multimedia" (The Morgan Kaufman Series in Networking) ;Nov. 2, 1999.
Joseph Kee-Yin Ng et al.; "A Distributed MPEG Video Player System with Feedback and QoS Control"; 1998.
K. Sklower et al.; "The PPP Multilink Protocol (MP)," RFC; 1996.
Kam-yiu Lam et al.; "A Priority Feedback Mechanism for Distributed MPEG Video Player Systems"; 1997.
Kanak Juvva; "A Real-Time Push-Pull Communications Model for Distributed Real-Time and Multimedia Systems"; Jan. 1999.
Kantarci, Aylin et al.; Design and Implementation of a Video on Demand System for the Internet, PV2000 Packet Video Workshop, Workshop Proceedings; May 2000.
Karl Aberer; "Resource Prediction and Admission Control for Interactive Video Browsing Scenarios Using Application Semantics," GMD Report 40; Sep. 1, 1998.
Ketan Mayer-Patel; A multicast control scheme for parallel software only video effects processing; 1999.
Ketan Mayer-Patel; "Exploiting spatial parallelism for software only video effects processing"; 1999.
Ketan Mayer-Patel; "Exploiting temporal parallelism for software only video effects processing"; 1998.
Ketan Mayer-Patel; "Performance of a software MPEG video decoder"; 1993.
Ketan Mayer-Patel; "Synchronized continuous media playback through the world wide web"; 1996.
Krishnan Natarajan; "Video Servers Take Root"; 1995.
Long, D.D.E.; Providing Performance Guarantees in an FDDI Network, Distributed Computing Systems ("Long—FDDI Network"); 1993.
Long, Darrell et al.; A variable bandwidth broadcasting protocol for video-on-demand; Jan. 2003.
Long, Darrell et al.; Adding Adaptive Flow Control to; Swift/RAID, IEEE ; ; 1995.
Louis C. Yun; "Digital Video in a Fading Interference Wireless Environment"; 1996.
MacDonald Hall Jackson III; "Berkeley CMT Media Playback API"; Oct. 1996.
Manfred Hauswirth; "A Component and Communication Model for Push Systems"; Sep. 1999.
Marcel Dasen; "An Error Tolerant Scalable Video Stream Encoding and Compression for Mobile Computing," In Proceedings of ACTS Mobile Summit 96, pp. 762-771; 1996.
Mark Handley; GeRM: Generic RTP Multiplexing, Internet Engineering Task Force, Internet Draft; 1999.
Mark Lacas; "The MediaLink Real-Time Multimedia Network," presented at the 95th Convention, Audio Engineering Society, Oct. 7-10, New York; 1992.

(56) References Cited

OTHER PUBLICATIONS

Lawrence A. Rowe et al.; MPEG Video in Software: Representation, Transmission, and Playback, High Speed Networking and Multimedia Computing, Symp. on Elec. Imaging Sci. & Tech; Feb. 1994.
Mayer-Patel, Ketan et al.; Design and Performance of the Berkeley Continuous Media Toolkit, SPIE vol. 3020; 1997.
McCanne, Steven ; Scalable Compression and Transmission of; Internet Multicast Video ; ; Dec. 1996.
MetaFilter; "Flash Player 6 Beta", http://www.chiark.greenend.org.uk/~theom/riscos/docs/PodLoader.txt; Feb. 15, 1989.
Michael A. Smith; "Video Skimming for Quick Browsing based on Audio and Image Characterization"; Jul. 30, 1995.
Michael Macedonia; "MBone Provides Audio and Video Across the Internet", IEEE Computer, pp. 30-36; Apr. 1994.
Michael Merz; "Iterative Transmission of Media Streams"; 1997.
Mielke, Markus, et al.; A Multi-Level Buffering and Feedback Scheme for Distributed Multimedia Presentation Systems, 7th International Conf. on Computer Communications and Networks; Oct. 1998.
Mourad Daami; "Synchronized Control of Coded Video Streams: Algorithms and Implementation"; 1997.
Navin Chaddha; "An End to End Software Only Scalable Video Delivery System"; 1995.
Object Management Group; "Notification Service Specification"; Jun. 2000.
P. Halvorsen; "Q-L/MRP: A Buffer Management Mechanism for QoS Support in a Multimedia DBMS"; Aug. 1998.
P.C. Wong; "Redundant Array of Inexpensive Servers (RAIS) for On Demand Multimedia Server"; 1997.
Peter Parnes; mMOD: the Multicast Media-on-Demand system: Mar. 6, 1997.
Philipp Hoschka; "Sychronized Multimedia Integration Language"; Feb. 1998.
Phillip DeLeon; "An Adaptive Predictor for Media Playout Buffering"; 1999.
Price, Harold E. et al.; Protocols for Store-and-Forward Message Switching via Microsatellites, AIAA/USU Conference on Small Satellites; 1991.
Price, Harold, et al.; PACSAT Broadcast Protocol ARRL/CRRL Amateur Radio 9th Computer Networking; Conference ; ; Sep. 22, 1990.
QuickTime 4 Pub.; QuickTime File Format; Mar. 2001.
R. Braden; "Updated Transmission Control Program"; Oct. 1989.
R. Fielding; "RFC2616—Hypertext Transfer Protocol 1.1," Network Working Group; Jun. 1999.
R. Stewart; "Stream Control Transmission Protocol," RFC 2960; Oct. 2000.
Ralf Guido Herrtwich; "A System Software Structure for Distributed Multimedia Systems," IBM European Networking Center, ACM SIGOPS European Workshop; 1992.
Ranga Ramanujan; "Adaptive Streaming of MPEG Video over IP Networks"; 1997.
Rao, Anup. et al.; Real Time Streaming Protocol (RTSP): 1996.
Ray Chang: "Optimizations of Stored VBR Video Transmission on CBR Channel"; Oct. 1997.
RealNetworks; Embedded Realplayer Extended Functionality Guide—RealSystem G2; Dec. 21, 1998.
Rejaie, Reza; An End-To-End Architecture for Quality Adaptive Streaming Applications in the Internet, PhD dissertation; Dec. 1999.
Reza Rejaie; "Architectural Considerations for Playback of Quality Adaptive Video over the Internet"; Nov. 3, 1998.
Reza Rejaie; "Quality Adaptation for Congestion Controlled Video Playback Over the Internet"; Feb. 15, 1999.
Reza Rejaie; "RAP; An end-to-end rate-based congestion control mechanism for realtime streams in the Internet," IEEE; Mar. 1999.
Reza Rejaie; "An End-To-End Architecture for Quality Adaptive Streaming Applications in the Internet"; Dec. 1999.

Roger B. Dannenberg; "The CMU MIDI Toolkit," Computer Science Department and Center for Art and Technology Carnegie Mellon University; 1985.
Roger L. Haskin; "Tiger Shark—A scalable file system tor multimedia," IBM Journal of Research and Development; Mar. 1998.
Rowe, Lawrence A. et al.; A Continuous Media Player, Computer Science Division-EECS, University of California, Berkeley, Technical Report No. UCB/CSD-93-768; 1993.
Rowe, Lawrence A. et al.; The Berkeley Distributed Video-on Demand System, Computer Science Division-EECS, University of California, Berkeley Technical Report No. UCB/CSD-97-959.; 1997.
S. Casner; "Compressing IP/UDP/RTP Headers for Low Speed Serial Links," RFC 2508, http://tools.ietforg/html/rfc2508; Feb. 1999.
Schulzrinne, H. et al.; Real Time Streaming Protocol (RTSP), RFC2326; Apr. 1998.
Shanwei Cen; "A Distributed Real-Time MPEG Video Audio Player," ACM Digitial Library; 1995.
Shanwei Cen; "Flow and Congestion Control for Internet Media Streaming Applications"; 1997.
Silvia Hollfelder; "Admission Control Framework for Multimedia Applications with Variable Consumption Rates in Client-Pull Architectures"; Sep. 1998.
Song, Yuqing, et al.; NetMedia: Synchronized Streaming of Multimedia Presentations in Distributed Environments, IEEE; 1999.
Sreenivas Gollapudi; "Buffer Management in Multimedia Database Systems," Dept. of Computer Science State Univ. of New York at Buffalo; 1996.
Sridevi Palacharla; "Design and Implementation of a Real-time Multimedia Presentation System using RPT"; 1997.
Steven J. Murdoch; "Embedding Covert Channels into TCP/IP"; 2005.
Steven Ray McCanne; "Scalable Compression and Transmission of Internet Multicast Video"; Dec. 1996.
Stuart R. Faulk; "On Synchronization in Hard-Real-Time Systems," Communications of the ACM, vol. 31, No. 3; Mar. 1988.
Su, Jun; Continuous Media Support for Multimedia Databases, Thesis; 1998.
Sungyoung Lee; "An Integrated Push/Pull Buffer Management Method in Multimedia Communication Environments"; Jun. 2000.
Swarup Acharya; "Balancing Push and Pull for Data Broadcast"; May 1997.
Tanenbaum, Andrew S.; Computer Networks; 1996.
TCP/Darpa; Darpa Internet Program, Transmission Control Program, RFC793; Sep. 1981.
Thomas Buchholz; "Preparation of the Media Streaming Protocol for Live-Streaming of MPEG-2 Content"; May 2001.
Thomas D.C. Little; "Multimedia Synchronization Protocols for Broadband Integrated Services"; Dec. 1991.
Thomas Peuker; "An Object-Oriented Architecture for the Real-Time Transmission of Multimedia Data Streams"; Mar. 17, 1997.
Timothy Sherwood; "Predictor-Directed Stream Buffers"; Dec. 2000.
Ulrich Thiel; "Multimedia Management and Query Processing Issues in Distributed Digital Libraries: A HERMES Perspective": 1998.
V. Jacobson; "Compressing TCP/IP Headers for Low-Speed Serial Links," RFC 1144; Feb. 1990.
Veli Hakkoymaz; "Automating the Organization of Presentation for Playout Management in Multimedia Databases"; 1996.
Wei Zhao; Bandwidth-Efficient Continuous Media Streaming through Optimal Multiplexing; 1999.
Willebeek-LeMair, M.H. et al.; Bamba-Audio and video streaming over the Internet, IBM J. Res. Develop, vol. 42 No. 2; Mar. 1998.
Wu-chi Feng; "A Priority-Based Technique for the Best-Effort Delivery of Stored Video" SPIE/IS&T Multimedia Computing and Networking; Jan. 1999.
Wu-Hon Leung; "A Software Architecture for Workstations Supporting Multimedia Conferencing in Packet Switching Networks," IEEE Journal on Selected Areas in Communications, vol. 8, No. 3; Apr. 1990.

(56) References Cited

OTHER PUBLICATIONS

Y.B. Lee; "A Server Arry Approach for Video-on-demand Service on Local Area Networks"; 1996.
Yatin Chawathe; "Encyclomedia: An archival architecture for the Mbone"; 1997.
Yeali S. Sun; "A Buffer Occupancy-Based Adaptive Flow Control and Recovery Scheme for Real-time Stored MPEG Video Transport"; 1998.
Yitzhak Birk; "Deterministic Load-Balancing Schemes for Disk-Based Video-on-Demand Storage Servers," Fourteenth IEEE Symposium on Mass Storage Systems; 1995.
Zheng, Bing, et al.; Multimedia Over High Speed Networks: Reducing Network Requirements With Fast Buffer Fillup; 1998.
Zhigang Chen; "Video and Audio: Organization and Retrieval in the WWW"; 1996.
"Archimedes Podule Loaders" http://www.chiark.greenend.org.uk/~theom/riscos/docs/PodLoader.txt; Feb. 2, 1989.
"ATSC Digital Television Standard—A53"; Sep. 16, 1995.
Transmission Control Protocol DARPA Internet Program Protocol Specification, RFC 793; Sep. 1981.
International Standard ISO IEC 11172-1; Aug. 1, 1993.
International Standard ISO IEC 11172-2; Aug. 1993.
ISO/IEC 13818-1 (MPEG2); Nov. 13, 1994.
ISO/IEC 13818-2 (MPEG2); Mar. 25, 1994.
KDD's Development of Internet-related Technologies; Feb. 5, 1998.
MIDI 1.0 Detailed Specification, Document Version 4.2, Revised Sep. 1995, The MIDI Manufacturers Association, Los Angeles, CA; Sep. 1995.
Apple Computer, Inc. Technical Publications; QuickTime 4 Reference for Macintosh and Windows; Jul. 1999.
Tucson Amateur Packet Radio (TAPR); Oct. 22, 1999.
Howard P. Katseff; AT&T Documents; 1992.
Alexander Engman et al., "High Performance Video Streaming on Low End Systems," (Dec. 1, 1997), M. Sc. Thesis in Electrical D Engineering performed at Telia Research AB, Nattjanster Division, Stockholm.
Silvia Hollfelder et al., "Transparent Integration of Continuous Media Support into a Multimedia DBMS," (Dec. 1, 1997) D Arbeitspapiere der GMD, German National Research Center for Information Technology, No. 1104.
Jun Su, "Continuous Media Support for Multimedia Databases," (1999) Master of Science thesis from Queen's University, D Kingston, Ontario, Canada.
International Standard ISO/IEC 11172-1, "Information Technology-Coding of moving pictures and associated audio for digital storage media at up to about 1,5 Mbit/s—Part 1: Systems," (Aug. 1, 1993).
International Standard ISO/IEC 11172-2, "Information Technology-Coding of moving pictures and associated audio for storage media at up to about 1,5 Mbit/s—Part 2: Video," (Aug. 1, 1993).
International Standard ISO/IEC 11172-3, "Information Technology-Coding of moving pictures and associated audio for digital storage media at up to about 1,5 Mbit/s—Part 3: Audio," (Aug. 1, 1993).
F.Kozamernik, "Webcasting—the broadcasters' perspective," (Mar. 1, 2000) EBU Technical Review: No. 282.
Susanne Boll et al., "Intelligent Prefetching and Buffering for Interactive Streaming of MPEG Videos," (Apr. 1, 2000) Ulmer Informatikberichte Nr. 2000-05, Germany.
Bing Zheng and Mohammed Atiquzzaman, "Video on Demand over ATM: System Design and Networking Requirements," (Jun. 1998) ENCOM-98: Enterprise Networking and Computing '98 in conjunction with ICC/SUPERCOMM '98, pp. 114-121 (see http://www.cs.ou.edu/-atiq/publications.html).
Bing Zheng and Mohammed Atiquzzaman, "Multimedia Over ATM: Progress, Status and Future, 7th Int'l Conference on Computer Communications and Networks," (Oct. 12-15, 1998) (see http://ieeexplore.ieee.org/xpl/tocresult.jsp?isnumber=15975 &isYear=1998).
Microsoft Windows Media Player version 6.1, Sep. 29, 1997.
Microsoft Windows Media Player version 6.4, Apr. 29, 1999.
Microsoft Windows Media Player version 7.0, Jul. 17, 2000.
Microsoft Windows Media Server version 4.1, 2000.
"The VXtreme Web TheaterTM system, including the Web Theater Server, Web Theater Client, Web Theater Producer, and VXtreme Video Codec V2," 1997.
IPR2015-01033 Decision Denying Institution, Oct. 19, 2015.
IPR2015-01033 Decision Denying Rehearing, Dec. 28, 2016.
IPR2015-01036 Final Written Decision, Oct. 20, 2016.
IPR2015-01037 Decision Denying Rehearing, Dec. 28, 2016.
IPR2016-01161 Decision Denying Institution, Dec. 12, 2016.
IPR2016-01162 Decision Denying Institution, Dec. 12, 2016.
IPR2016-01238 Decision Instituting, Jan. 4, 2017.
IPR2016-01239 Decision Instituting, Dec. 27, 2016.
Shae, et al., Large Scale Experiments on Low Bit Rate Multimedia Broadcast, IS&T/SPIE Conference on Visual Communications and Image Processing '99, SPIE vol. 3653, Jan. 1999.
Dwire, Client/Server Computing, McGraw-Hill, Inc., 1993.
IPR2016-01655 Decision Denying Institution, Feb. 27, 2017.
IPR2016-01656 Decision Instituting, Feb. 27, 2017.
IPR2016-01657 Decision Denying Institution, Feb. 27, 2017.
IPR2016-01658 Decision Instituting, Feb. 27, 2017.
IPR2015-01035 Decision Denying Institution, Oct. 23, 2015.
IPR2015-01036 Decision Instituting, Oct. 23, 2015.
IPR2015-01037 Decision Denying Institution, Oct. 19, 2015.
Icecast, Authors, Jul. 1999.
Icecast, FAQ, Jul. 1999.
Icecast, How to Configure, Jul. 1999.
Icecast, README, Jul. 1999.
Icecast, Welcome to Icecast Web Admin Interface, Jul. 1999.
Icecast, icecast.conf, Jul. 1999.
Icecast, source.c, Jul. 1999.
Icecast, connection.c, Jul. 1999.
Icecast, sock.c, Jul. 1999.
Icecast, utility.c, Jul. 1999.
Icecast, relay.c, Jul. 1999.
Icecast, main.c, Jul. 1999.
Icecast, icetypes.h, Jul. 1999.
Icecast, client.c, Jul. 1999.
Icecast, ice_string.c, Jul. 1999.
Icecast, icecast.h, Jul. 1999.
Icecast, sock.h, Jul. 1999.
Shout.c, Jul. 1999.
Eric Cole,"Hiding in Plain Sight: Steganography and the Art of Covert Communication," Apr. 11, 2003; Wiley Publishing, Inc., ISBN-10: 0471444499.
Eugene T. Lin et al.,"Streaming video and rate scalable compression: what are the challenges for watermarking," Jan. 2004.
J.D. Gibson,"Multimedia Communications," Nov. 2, 2000; ISBN-10: 0122821602.
Jens Meggers et al.,"A Video Gateway to Support Video Streaming to Mobile Clients," Nov. 1998.
Ke Shen,"A Parallel Implementation of an MPEG1 Encoder: Faster Than Real-Time!" 1995.
Ketan Mayer-Patel,"Software only video production switcher for the Internet Mbone," Feb. 1994.
Richard Karpinski,"Beyond HTML," Apr. 1996; ISBN-10: 0078821983.
RealNetworks,"Real Player 7 Plus Manual," Nov. 1999.
"MacPacSat," Dec. 1998; Gilbert Mackall (N3RZN) & Dog Park Software Ltd. (VE3VRW).
Bob Breedlove et al., "Web Programming Unleashed," Jan. 1996; ISBN-10: 1575211173.
Darrell D.E. Long, "A variable bandwidth broadcasting protocol for video-on-demand," Jan. 1999.
Christopher Yavelow,"Music & Sound Bible," IDG Books Worldwide, Inc.; Jul. 1992; ISBN-10: 1878058185.
Nathaniel Polish, "The Burstware Family of Protocols," Jan. 1996.
IPR2015-01035 Decision Denying Rehearing; Apr. 4, 2017.
IPR2017-00784 Decision Instituting; Mar. 31, 2017.
IPR2017-00785 Decision Instituting; Apr. 13, 2017.
IPR2017-00786 Decision Granting Joinder; Jun. 5, 2017.
IPR2017-00820 Decision Granting Joinder; Jun. 5, 2017.

* cited by examiner

STREAMING MEDIA DELIVERY SYSTEM

CROSS-REFERENCE TO RELATED APPLICATIONS

This application is a continuation of U.S. patent application Ser. No. 13/815,040, filed Jan. 25, 2013 (published on Jun. 13, 2013 as U.S. patent publication number 2013/0151724 A1), which was a continuation of U.S. patent application Ser. No. 13/385,375, filed Feb. 16, 2012 (published on Jun. 28, 2012 as U.S. patent publication number 2012/0166669 A1 and now U.S. Pat. No. 8,364,839, issued Jan. 29, 2013), which was a continuation of U.S. patent application Ser. No. 12/800,177, filed May 10, 2010 (published on Sep. 2, 2010 as U.S. patent publication number 2010/0223362 A1 and now U.S. Pat. No. 8,185,611, issued May 22, 2012), which was a continuation of U.S. patent application Ser. No. 10/893,814, filed Jul. 19, 2004 (published on Dec. 9, 2004 as U.S. patent publication number 2004/0249969 A1, and now U.S. Pat. No. 7,716,358, issued May 11, 2010), which was a continuation-in-part of U.S. patent application Ser. No. 09/819,337, filed Mar. 28, 2001 (now U.S. Pat. No. 6,766,376, issued Jul. 20, 2004), which was a nonprovisional of U.S. provisional patent application Ser. No. 60/231,997, filed Sep. 12, 2000; and it claims the benefit, under 35 U.S.C. §120, of the respective filing dates of said nonprovisional applications, and the benefit under 35 U.S.C. §119(e) of said provisional application, as well as benefit under 35 U.S.C. §§120 and 119(e) (as applicable) of the filing dates of: copending U.S. patent application Ser. No. 10/825,869, filed Apr. 16, 2004 (published on Dec. 23, 2004 as U.S. patent publication number 2004/260828 A1), which was a continuation of said U.S. patent application Ser. No. 09/819,337, which was a nonprovisional of said provisional patent application Ser. No. 60/231,997; and hereby incorporates by reference the entire disclosure of each of said prior applications. This application further incorporates by reference the entire disclosure of U.S. patent application Ser. No. 13/374,942, filed Jan. 24, 2012 (published on Jun. 14, 2012 as U.S. patent publication number 2012/0151083 A1, and now U.S. Pat. No. 8,327,011, issued Dec. 4, 2012, which was a continuation of U.S. patent application Ser. No. 12/800,152, filed May 10, 2010 (published on Sep. 16, 2010 as U.S. patent publication number 2010/0235536 A1, and now U.S. Pat. No. 8,122,141, issued Feb. 21, 2012), which was also a continuation of said U.S. patent application Ser. No. 10/893,814.

BACKGROUND OF THE INVENTION

Field of the Invention

The present invention relates to multimedia computer communication systems; and more particularly, to systems and methods for delivering streaming media, such as audio and video, on the Internet.

Description of the Related Art

Prior to the development of Internet streaming media technologies, audio and video were formatted into files, which users needed to download in their entirety to their computers before the files could be heard or viewed. Real time, continuous media, as from a radio station, was not suitable for this arrangement, in that a file of finite size must be created so it could be downloaded. The advent of streaming media technologies allowed users to listen to or view the files as they were being downloaded, and allowed users to "tune-in" to a continuous media broadcast, or "stream", such as from a radio station.

Sending audio or video files via a network is known in the art. U.S. Pat. No. 6,029,194 to Tilt describes a media server for the distribution of audio/video over networks, in which retrieved media frames are transferred to a FIFO buffer. A clock rate for a local clock is adjusted according to the fullness of the buffer. The media frames from the buffer are sent in the form of data packets over the networks in response to interrupts generated by the local clock. In this manner, the timing for the media frames is controlled by the user to assure a continuous stream of video during editing. U.S. Pat. No. 6,014,706 to Cannon, et al. discloses an apparatus and method for displaying streamed digital video data on a client computer. The client computer is configured to receive the streamed digital video data from a server computer via a computer network.

The streamed digital video data is transmitted from the server computer to the client computer as a stream of video frames. U.S. Pat. No. 6,002,720, to Yurt, et al. discloses a system for distributing video and/or audio information, wherein digital signal processing is employed to achieve high rates of data compression. U.S. Pat. No. 5,923,655, to Veschi et al. discloses a system and method for communicating audio/video data in a packet-based computer network, wherein transmission of data packets through the computer network requires variable periods of transmission time. U.S. Pat. No. 5,922,048 to Emura discloses a video server apparatus having a stream control section that determines a keyframe readout interval and a keyframe playback interval, which satisfy a playback speed designated by a terminal apparatus. Finally, U.S. Pat. No. 6,014,694 to Aharoni, et al. discloses a system and method for adaptively transporting video over networks, including the Internet, wherein the available bandwidth varies with time.

Despite these developments, users viewing or listening to streaming content over Internet connections often encounter interruptions, due to the frequency of unanticipated transmission delays and losses that are inherent in many Internet protocols. These interruptions are commonly referred to as "dropouts", meaning that the data flow to the user has been interrupted (i.e., the audio "drops out").

Dropouts can be extremely annoying—for example, while listening to music. The current state-of-the-art solution to the problem uses a pre-buffering technique to store up enough audio or video data in the user's computer so that it can play the audio or video with a minimum of dropouts. This process requires the user to wait until enough of the media file is buffered in memory before listening or viewing can begin. The media data is delivered by a server computer, which has available to it the source of the media data, such as by a connection to a radio station. When the user connects to the server via the Internet, audio/video output at the user's system is delayed while the user's buffer is filled to a predetermined level. Typical pre-buffering wait times range from ten to twenty seconds or more, determined by the vendor providing the audio or video media. Even with this pre-buffering process, interruptions in playback still occur.

In this process, the user has a software application on the computer commonly called a "media player". Using the features built into the media player, the user starts the audio or video stream, typically by clicking on a "start" button, and waits ten to twenty seconds or so before the material starts playing. During this time data is being received from the source and filling the media player's buffer. The audio or video data is delivered from the source at the rate it is to be played out. If, for example, the user is listening to an audio stream encoded to be played-out at 24,000 bits per second, the source sends the audio data at the rate of 24,000 bits per second. Provided that the user waits ten seconds, and the receipt of the buffering data has not been interrupted, there is enough media data stored in the buffer to play for ten seconds.

Gaps in the receipt of audio/video data, due to Internet slowdowns, cause the buffer to deplete. Because transmission of audio/video media data to the user takes place at the rate it is played out, the user's buffer level can never be increased or replenished while it is playing. Thus, gaps in the receipt of audio/video media data inexorably cause the buffer level to decrease from its initial level. In time, extended or repeated occurrences of these gaps empty the user's buffer. The audio/video material stops playing, and the buffer must be refilled to its original predetermined level before playing of the media resumes.

By way of illustration, if, in a ten second pre-buffering scenario, data reception stopped the instant that the media started playing, it would play for exactly ten seconds. Once the media data starts playing, itplays out of the buffer as new media data replenishes the buffer. The incoming data rate equals the rate at which the data is played out of the user's buffer, assuming the receipt of data across the Internet is unimpeded. If there are no interruptions in the receipt of the media data for the duration of the time the user listens to or watches the material, the buffer level remains constant and there will still be ten seconds of data stored in the media player's buffer when the user stops the player.

On the other hand, if the media player encounters interruptions totaling six seconds while playing the material, there would only be four seconds of media data remaining in the buffer when the user stopped it. If data reception interruptions at any time during the playing exceed ten seconds, the user's media player buffer becomes exhausted. There is no media data to play, and the audio or video stops—a dropout has occurred. At this point a software mechanism in the media player stops attempting to play any more of the material, and starts the buffering process again. The media player remains silent until the buffer refills, at which time the media player will once again start playing the material. This pattern has brought about considerable consumer frustration with streaming media over the Internet.

BRIEF SUMMARY OF THE INVENTION

There is a need for improved systems and methods for delivering streaming content over the Internet or other communications medium, which facilitate continuous transmission of streaming content, respond on demand without objectionable buffering delay, and perform without disruption or dropouts.

To address these objectives, various embodiments for delivering streaming content are provided, which envision that both the server and user systems involved in the content delivery may have buffering capacity. The embodiments make varying uses of this capacity to facilitate continuous content transmission on demand. Nearly instantaneous playback is achieved, while maintaining protection against playback interruption.

In one aspect, the server and user-sides of the transmission are coordinated, by (a) sending initial streaming media elements to the user system at a sending rate more rapid than the playback rate, to fill the user buffer; and (b) after the user buffer has been filled, sending further streaming media data elements to the user system at about the playback rate.

In another embodiment, the user system may be used to regulate transmission of streaming media to it, by a streaming media server. In such embodiment, the server may operate by (a) assigning identifiers to the sequential media data elements comprising the program; (b) receiving requests from the user system for media data elements corresponding to specified identifiers; and (c) sending media data elements to the user system responsive to said requests. A user system used in connection with such an embodiment may operate by (i) maintaining a record of the identifier of the last sequential media data element that has been received by said player; (ii) requesting transmission of the next sequential media data elements following said last sequential media data element, as said media player requires for continuous and uninterrupted playback.

Other aspects and advantages of the invention will be apparent from the accompanying drawings and the detailed description that follows.

BRIEF DESCRIPTION OF THE DRAWINGS

The invention will be more fully understood and further advantages will become apparent when reference is had to the following detailed description and the accompanying drawings, in which.

DESCRIPTION OF THE PREFERRED EMBODIMENTS

Figure 1:
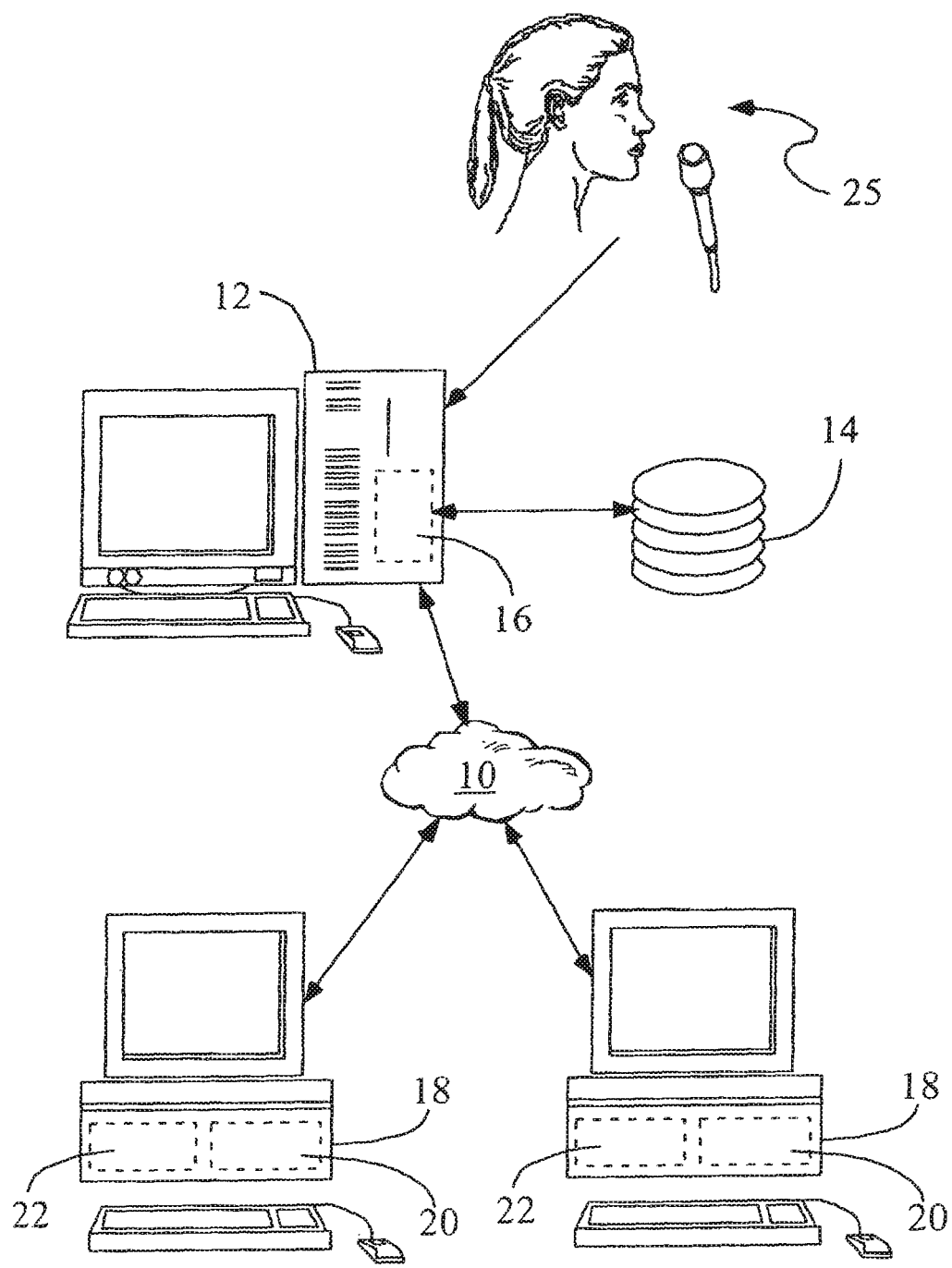
FIG. 1 is a schematic/block diagram illustrating the elements of a streaming media buffering system in accordance with one embodiment of the present invention.

The following is a detailed description of certain embodiments of the invention chosen to provide illustrative examples of how it may preferably be implemented.

Audio and video media must play out over a period of time. Thus, in considering the delivery of such media, it is more appropriate in certain respects to think of bandwidth requirements than file size. The bandwidth requirement of audio or video media refers to the data rate in bits per second that must be transmitted and received in order to listen to or view the material uninterrupted.

Transmitting the audio or video material over a connection slower than the bandwidth requirement results in unsatisfactory viewing or listening, if viewing or listening is possible at all. The connection available may, for example, be by dialup modem, which has a maximum receive data rate of 56,000 bits per second. Audio and video encoded for distribution over the Internet may be compressed to be listenable or viewable within such a 56,000 bits per second bandwidth. Requirements for achieving adequate audio and video over the Internet may consume a considerable portion of the listener's available bandwidth.

There are two types of encoding schemes used for audio and video material—"Variable Bit Rate" (VBR), and "Constant Bit Rate" (CBR). CBR encoding represents the encoded media with a constant bit rate per second, regardless of the complexity of the material being encoded. For example, if an audio source is encoded at 20 kilobits per second at a Constant Bit Rate, the media data being produced from the encoding is at 20 kilobits per second, whether the audio material is complex (e.g., symphonic) or silence. Variable Bit Rate encoding uses a variable number of bits to represent sounds or video, with more bits required for complex material (e.g., symphonic sounds or action scenes) than for simple sounds, silence, or still scenes. The most usual encoding scheme used for streaming media is CBR, because the resulting data rate is more predictable than for VBR. Statements in this specification concerning "constant" data rates and the like should be understood as subject to appropriate variation where VBR-encoded data may be involved.

Even if a user's Internet connection has the requisite average bandwidth capacity to allow reception of the program, the actual rate of delivery of data to the user can fluctuate widely above, and more particularly, below, this average, as a function of the quality of the user's connectivity at any given time. Internet connection quality can vary rapidly over time, with two primary factors responsible for degradation of the instantaneous bandwidth actually available to the user. These factors are the quality of the user's Internet connection, which can have periods of interference causing reduced available bandwidth, and momentary Internet congestion at various points along the route over which the user's data flows. Each of these factors can cause delays and interruptions in the transmission of data to the user. Internet data communications devices such as routers are designed to drop data packets if they get overloaded. For material that is not time sensitive, these dropped packets will usually be resent, and the user will eventually be presented with the material. However, since streaming media is time sensitive, dropped packets can have a significant impact on the receipt and playback of an audio or video stream. Such degradation in the receipt of Internet data is very common, and prevent most users from being able to listen to or view streaming media without interruption unless some special provisions have been incorporated into the user's computer software to accommodate data transmission interruptions.

There are two fundamental types of streaming media, which affect, in some respects, the requirements for smooth and continuous delivery: (i) material that originates from a source having a realtime nature, such as a radio or TV broadcast, and (ii) material that originates from a non-real-time source such as from a disk file. An example of non-real-time material might be a piece of music stored as a disk file, or a portion of a broadcast that originally was realtime, perhaps yesterday's TV evening news, and was recorded into a disk file. For purposes of clarity within this document, streaming media of type (i) will be referred to as "real time" or "broadcast" media, and streaming media of type (ii) will be referred to as "file based" media.

In many respects, both streaming media types are handled similarly in conventional systems, and both are handled similarly (in a number of respects) by the streaming media delivery system of the present invention. Nevertheless, the two streaming media types are readily distinguished. Broadcast streaming media has as its source a system or arrangement that by definition can only be transmitted to users as fast as the material is generated; for example, a disk jockey speaking into a microphone. File based media, on the other hand, can be transmitted to users at any available data rate, since in the context of data communications, the time required for reading a small portion of data from a file residing entirely on a locally accessible, random access storage device may be considered negligible.

In conventional systems for streaming media over the Internet, media data (whether real-time or file based) is simply transmitted from the server to the user at the rate at which it will be played out (the "playback rate"), regardless of the data rate capabilities of the connection between the server and the user.

Conventional streaming media systems may incorporate server-side buffering systems for programmatic purposes. For example, the system may buffer media data at the server for the purpose of packet assembly/disassembly. Media data may also be buffered at the server to permit programming conveniences such as dealing with blocks of data of a specific size. However, conventional streaming media systems have not utilized server-side buffering for the purpose of mitigating long term Internet performance degradation. Rather, prior art systems, in which data is continuously transmitted at the playback rate, have performed buffering for continuity purposes solely on the user side, with the consequences discussed above of startup delays and dropouts. The present invention addresses such shortcomings.

The present invention provides a system and method for delivering streaming media, such as audio or video media, via the Internet or other communications medium. Immediate playing of the media on a user's computer is afforded, while reducing interruptions in playback due to Internet congestion, and temporary modem delays due to noisy lines. Nearly instantaneous playback is achieved, while maintaining protection against playback interruption. Delayed starts, heretofore required to provide protection against interruption, are avoided. Data lost due to interruptions in the receipt of media data by the media player can be recovered while the player continues to play out the audio or video material. If the interruptions are so severe as to deplete the user's buffer and stop the play out, the media player can quickly recover as well, by beginning to play out again without waiting to first build up the buffer, as soon as the media player begins to receive media data elements.

In one embodiment, the invention provides a system for distributing via the Internet streaming media composed of a plurality of time-sequenced data elements. As shown in FIG. 1, the system is provided with a server 12 connected to the Internet 10 for transmitting the streaming media data elements. Associated with the server 12 is a server buffer 14 for storing at least one of the data elements for transmission, and a buffer manager 16. Buffer 14 is a conventional computer storage mechanism such as a hard disk, as shown for convenience of illustration, or, preferably, an electronic storage arrangement such as Random Access Memory (RAM).

The media may come from a live source, shown as 26 in FIG. 1, or from a stored file on the server 12, or another storage device, such as a hard drive.

A number of different implementations of such a server, involving different ways of handling server buffer 14, will be discussed.

In the various implementations, there is in each case at least one user computer 18 (or similar device) connected to the server 12 via the Internet 10 or other data communications medium. User computer 18 is associated with media player software incorporating user buffer 20. The user buffer 20 is provided with means for storing a predetermined number of the data elements. User buffer 20 is a conventional computer storage mechanism such as a hard disk, or, preferably, an electronic storage arrangement such as Random Access Memory (RAM) as suggested by the illustration. A buffer manager 22 is also associated with the user computer 18. The buffer manager 22, having the form of software or firmware, is provided with means for receiving and storing a predetermined number of media data elements which are received sequentially by the media player, playing the data out sequentially as audio and/or video, and deleting media data elements from the buffer as they are played out (or displacing them by newly arrived elements). As data is played out, the next sequential data elements are received from the server in such a fashion as to approximately maintain the predetermined number of data elements in the user's buffer. It should be understood that data might arrive at the media player out-of-sequence and that processes in the media player or the media player buffer manager are responsible for properly arranging this data.

Alternatively, user computer 18 may be replaced by an Internet radio or Internet Appliance, which is comprised of a dedicated processor for receiving Internet radio or audio/video material. Examples of such devices might range from familiar computing devices such as palmtops, PDAs (Personal Digital Assistants), and wireless phones, to devices that appear and operate similarly to conventional consumer electronic devices such as radios and televisions, but with the additional capability of Internet access.

FIFO Server Buffer Implementation

There are a large number of ways of managing server buffer 14 in order to implement the systems and methods described in this specification. In one implementation, buffer manager 16 is adapted to effectively render server buffer 14 a FIFO device. In this implementation, buffer manager 16 is provided in the form of software or firmware that provides means for: receiving the media data; supplying media data in order to the FIFO buffer; supplying the buffer 14 with a predetermined number of data elements; maintaining pointers 24a through 24n into the buffer, one for each user computer indicating the last media data element that has been sent to that user, thus indicating the next element or elements to be sent; and, once the FIFO buffer is full, deleting (or displacing) the oldest data element in the buffer as each new data element is received. These means are arranged to maintain the pre-determined number of data elements in the FIFO buffer. Buffer Manager 16 may also comprise means for digitizing, encoding, and packetizing the media data, and formatting media data according to the requirements of buffer 14.

Data Window Buffer Implementation

If the media source is file based, such as a music clip stored as a disk file, and if the disk file is stored on the server or an associated server computer, the server's connection to the source could be considered to be near instantaneous. In this case, rather than audio/video data filling and depleting the buffer 14, an amount of audio/video data equivalent to the desired buffer size may be logically constituted as a FIFO buffer. Such a construct is commonly called a data window. The data window moves on a time-sequenced basis through the media data file, thus defining the contents of the buffer on a moment-by-moment basis and performing the equivalent functions to receiving a new data element and deleting the oldest data element.

Example Buffering Methods

In an arrangement that receives media data directly or indirectly from a real-time source, such as a radio station, server buffer 14 might be set to hold (for example) 30 seconds of media data. Because the source produces media data in real time, the media data is delivered to the server approximately at the rate it is generated.

Of course, there can be variability in this data delivery process due to networking, disk accesses, and so on, causing the delivery rate of the media data to be variable over short periods of time, typically measured in seconds. But over a longer period of time measured in minutes or tens of minutes or longer, the media data is delivered from source to server at the rate it is generated, and the server in turn provides that media data to the FIFO buffer at that same rate. Since CBR encoding is typically used for streaming media, the media data is generated, received by the server, and provided to the buffer approximately at a fixed rate.

The server buffer 14 is filled the first time the media source connection is established or a disk file is read. The amount is preferably adequate to bridge gaps typical of Internet and modem delays to the user. This buffer may, for example, hold enough data elements for about one minute of play.

Once server buffer 14 is full, for each new data element received into the buffer the oldest data element is deleted (or displaced) from the buffer. In some implementations, requests from user computers to connect may not be accepted until server buffer 14 is full.

Once a connection is made to a user's computer (e.g., user computer 18), server 12 sends the media data to the user computer in the following manner. First, media data is sent to the user computer at a rate faster than the playback rate, which may be the highest rate that the data connection between the server and the user computer will support, or any lower rate that is a higher rate than the playback rate (referred to herein as a "higher than playback" rate), until the predetermined amount of data that had been stored in the server buffer has been transferred to the user's computer. Once the contents of server buffer 14 has been transferred, a steady state condition is reached wherein as each media data element arrives at server 12, it is immediately sent out to the user computer. In this steady state condition, the media data is sent at a rate that matches the constant fill rate of the server buffer, and is received at the same rate by the user computer if there are no interruptions in the transmission of media data between the server and the user's computer (with some variation in the case of VBR content). If interruptions have interfered with the arrival of sent media data to the user's computer, that data may have been "dropped" by routers in the Internet and needs to be resent. This causes data to "back up" into the server FIFO for that user.

A data communications transport mechanism, such as the TCP protocol, may be used for the reliable delivery of data in an ordered sequence from the source of the media data to the server, or from the server to the media player software of the user computer. Resending missing data is the responsibility of the reliable transport mechanism. The server buffer 14 "sends" data by delivering it to the transport mechanism. The transport mechanism actually manages transmission of the data across the communications medium, and has processes to determine if all the data that has been sent has been received by the destination. If not, missing pieces of data are automatically resent to the destination, and are arranged to be delivered to the target software on the destination system in an ordered fashion. In this example, the destination is user computer 18, and the target software on the destination system is the media player. If the transport mechanism determines that data is missing, it retransmits that data to the destination at a higher than playback rate. In another method of operation, server 12 can use an unreliable transport mechanism, such as UDP, and rely on a streaming software process to manage data delivery and the resending of data elements not received by the media player.

All media data to be delivered to a user computer may be sent at a higher than playback rate, either by the server buffer 14 passing media data to the transport mechanism, or by the transport mechanism delivering or redelivering the media data to the user computer.

This is enabled by buffering data at the server 12, and is distinctly different from prior art, in which media data is only sent from the server 12 to the user computer 18 at the rate at which it is to be played out.

As an example of the preceding description, if the server had been set to store 30 seconds of audio in its buffer, when a user connects, that 30 seconds worth of media data is transferred to the user's media player buffer at a higher than playback rate. The media player can begin playing as soon as it has received a very minimum amount of data, perhaps comprising only a single packet of media data.

For ease of understanding, consider the server buffer and the media player buffer to be an elastic system that between the two stores (for example) up 30 seconds of audio data. The server starts with 30 seconds of buffered audio data which it transfers to the media player until the server has no buffered media data and the media player has 30 seconds of buffered media data. Regardless of how much of the buffered media data has been transmitted to the media player, there always is 30 seconds of media data being buffered between the two locations. Consequently, the audio being played out by the media player will always be 30 seconds behind the audio at the source. If there were a media player in the radio station studio, an announcer would hear themselves through the media player with a 30 second delay.

Connections from the server 12 through the Internet 10 commonly are much faster than the data rate required for audio or video playback. This fact is insignificant for conventional servers because, not having a FIFO buffer or a buffer pointer for each user, audio/video data can only be sent as fast as it becomes available, or as fast as the pace at which it must be delivered to the user in order to be properly replayed. The user, typically interacting with media player software on the user's computer, selects a media source requiring a data rate slower than that available by the user's connection to the Internet. For example, if the user's connection to the Internet is made via a 56,000 bits per second modem, the user might select a media source encoded for playback at 24,000 bits per second.

With the present invention, as soon as a user connects to the server 12, the server 12 transmits audio/video data as sequential data elements from its buffer 14 to the buffer 20 of the user, at a higher than playback rate. Unlike the prior art, media begins to play on the user computer 18 as soon as the user connection is made to the audio server 12 and a minimal amount of data elements have been received and stored in the user's buffer 20. The user's buffer 20 is built up while the media is playing. As each data element is played, it is deleted or displaced from the user's buffer 20.

Initially, the user buffer manager 22 requests the server 12 to send media data elements to start the playback stream, such as by selecting a radio station from a list. The server 12 responds by sending data elements to the user computer 18 at higher than the playback rate, until the entire FIFO buffer 14 has been sent to the user computer. Upon receipt of the initial data elements, the user buffer manager 22 begins playback. Because (with reference to CBR content) this is a synchronous system with the source, server, and user computer operating by the same playback clock rate as determined by the encoding rate of the media, as each data element is played out and is deleted or displaced from the user buffer 20, another data element has been deposited into the server buffer 14 and is available to be sent to the user computer. Server 12 sends the newly available data elements at a higher than playback rate.

Since the connection from the Internet to the user is faster than that required for media playback, audio/video data is transmitted from the server faster than it is played out by the user system, thus building up audio/video data in the user buffer. For example, if the user's connection to the Internet is at 56,000 bits per second, and the data rate encoded for the media to be played is 24,000 bits per second, the buffer level of the user buffer 20 will fill at the rate of 32,000 bits per second (56,000 bits per second receive rate, minus 24,000 bits per second playout depletion rate).

If, for example, the server buffer 14 held one minute of audio/video data, eventually the user buffer 20 will hold one minute of audio/video data. The effect is that, over a brief period of time, the server buffer 14, or a designated portion of it, is transferred to the user buffer 20. In one embodiment, the number of data elements in the server buffer 14 actually never changes, it always maintains one minute of audio/video data. However, for the particular user under discussion, a copy of all the data held in the buffer has been sent to the user. Since the user buffer 20 now holds one minute of audio/video data, it can play continuously despite data reception interruptions of less than a minute.

Where some media data has been resent by the reliable transport layer, there may be more data to be sent than would be sent at the routine constant fill rate, and in such a case the server transport mechanism will again send the buffered media data at higher than the playback rate. Similarly, if the media player buffer begins to deplete or becomes depleted due to networking interruptions, the server will attempt to send as much data as is necessary to rebuild the user computer's buffer to the proper level, again at higher than a playback rate. This allows for rebuilding the user's computer buffer under circumstances wherein Internet interruptions have blocked the normal flow of data.

Thus, as soon as the interruption ceases, the user buffer 20 can begin to rebuild, which will take place at higher than the playback rate. The media player can continue to play out the audio/video material while the user buffer 20 rebuilds. When compared to conventional systems, which provide no capability to rebuild the user's computer buffer when data is lost, the streaming media buffering system of the present invention provides for recovery of lost data elements and the restoration of the user's buffer, even while the user media player continues to play.

Under conditions in which interruptions have interfered with the arrival of sent media data to the user's computer, data loss exceeding certain levels will cause the transport mechanism software to stop accepting data for transmission from the application software, namely the streaming media server software. Although other arrangements are possible within the scope of this invention, in preferred embodiments, the streaming media server software keeps track of the last data element in the FIFO buffer that has been sent to each user, using a software pointer. Alternatively, or in addition, a feedback manager may be associated with user computer 18, including means for sending to the source server the serial number of the last data element received, or for requesting more data. An interruption in the ability to send media data to a user results in the "last element" pointer "backing up" in FIFO buffer 14 in such a way that the server knows from what point in the buffer to restart sending data when the transport mechanism again requests data to send. When the server software receives that notification, it will begin sending data to the user starting from the next data element to send as indicated by the pointer, and sending as much data as the transport mechanism will accept. The transport mechanism will again send this data as fast as it can to the user. This process continues until the steady state condition is again reached wherein each data element is sent to the user as soon as it arrives from the media source, and a pre-determined number of data elements are maintained in user buffer 20.

The predetermined buffer level in the user buffer 20 may be set at less than the predetermined buffer level of the server buffer 14 if desired. For example, the server buffer 14 might be set to hold one minute of media data, and the user buffer 20 might be set to hold thirty seconds of media data. In another embodiment, a feedback manager 62 is associated with the user computer 18. The feedback manager 62 is provided with means for sending to the source server 12 the serial number of the last data element received. Feedback manager 62 has the form of software or firmware that tracks the last data element received and loaded into the user buffer. In addition, feedback manager 62 is adapted to send the serial number to the source server 12. In this manner, the source server 12 sends the media as sequential data elements at a rate dependent on the quality of the connection with each user computer 18. The media may come from a live source, shown as 25 in FIG. 1, or from a stored file on the source server 12, or another storage device, such as a hard drive.

Implementation with Feedback Manager

The buffer manager at the source server effectively renders the source buffer 14 a FIFO device holding a fixed amount of data with a constant, time-sequenced fill rate and a constant, time-sequenced depletion rate. Each audio/video data element carries a sequential serial number. Once the buffer 14 is full, each new audio/video data element, identified by a higher serial number, displaces the oldest audio/video data element, identified by the lowest serial number in the buffer 14. In the case of an instantaneous media source, rather than audio/video data filling and depleting the buffer, the top and bottom pointers spanning an amount of audio/video data equivalent to the desired buffer duration move synchronously on a time-sequenced basis to the next higher serial number of the audio/video data available in the system, thus defining the contents of the buffer on a moment-by-moment basis. Thus, if the buffer is capable of holding 100 audio/video data elements, constituting one minute of audio playback, the audio/video data elements within the buffer would hold serial numbers of B (baseline)+Tr (transmitted)+(0-99), wherein, starting at some arbitrary value B for the baseline, the serial number count would have been incremented by the number Tr representing the total number of data elements that have been transmitted, and the buffer at any point in time would hold the audio/video data elements in the range B+Tr+0 to B+Tr+99. On the next clock tick, the buffer holds B+(Tr+I)+0 to B+(Tr+I)+99.

The unique pointer assigned to each user identifies by serial number either the last data element that was sent to that user, or the next data element to be sent. The selection of either mode is arbitrary; but whichever mode has been selected, that mode is systematically implemented. For purposes of this document, we will use the "last data element that was sent." Thus, for any user, the pointer represents the serial number B+Tr+x, where x represents some value between 0 and 99, as being the serial number of the last audio/video data element that had been sent to the user. Each time a data element is transmitted to the user, x is incremented, pointing to the next higher value in the buffer. Each time a new data element is deposited in the buffer by the audio source, x is decremented. Since audio/video data elements are transmitted to the user faster than they are deposited into the buffer, x will increment faster than it decrements and over time will equal the maximum value of 99, pointing to the most recently deposited audio/video data element.

The amount of data stored in the source server buffer 14 remains the same, regardless of the pointer value associated with any individual user. The pointer indicates the last data element that has been transmitted to the user, and thus also identifies the next data element to be transmitted to the user.

When the user's pointer equals B+Tr+99, which is the most recently deposited audio/video data element, the user computer 18 receives audio/video data in real time from the media source. The moment the next audio/video data element is deposited into the source server buffer 14, a copy of that data element is transmitted to the user. The user buffer 18 will now contain 100 audio/video data elements, representing one minute of audio/video data, that will be played on a FIFO basis. In effect, the source server buffer 14 has been moved to the user buffer 20.

Since the user buffer 20 now holds one minute of audio/video data, it can play continuously despite data reception interruptions of less than a minute, and as soon as the interruption ceases the user buffer 20 can begin to rebuild.

The user computer 18 and the media server 12 are synchronized by a feedback manager in which the user computer 18 either acknowledges the receipt of the serialized audio/video data packets, or requests the next increment of audio/video data packets. This feedback enables the source server to keep track of the buffer pointer on each user's system.

Interrupts or delays in the flow of data from the source server to the user will cause the user's system to play audio out of the buffer without the buffer being replenished at the same rate. Consequently, the user buffer pointer will decrement at a faster pace than it increments, and the feedback mechanism will keep the source server buffer pointer for that user synchronized. All of the users' source server buffer pointers also decrement with each tick of the clock, as data flows in and flows out of the fixed size buffer. Thus, as a user buffer drains down, the user's source server buffer pointer indexes down as well, in lockstep. Since new audio/video data is continuously placed into the source server buffer from the source, this has the effect of rebuilding the user's buffer at the server.

Once this system is set in motion, a buffer of a preset duration is constantly maintained for each user, partially or completely at either source server or the listener's system, or ebbing and flowing between them as a result of moment-to-moment circuit conditions.

Distribution Fed From a Separate Source

In another embodiment, the buffer concept of this invention can be daisy-chained between multiple Servers. For example, a system might include a source server computer co-located in a radio station studio, which transmits to a network distribution server resident in a data center, to which users would connect. The source server would fill its buffer, transfer the buffer to the network distribution server using the process just described for transferring a buffer from a source server to a user, and then the network distribution server would transfer its buffer to the user, again, using the process just described except now with the network distribution server replacing the source server in delivering audio/video data to the user system.

Figure 2:
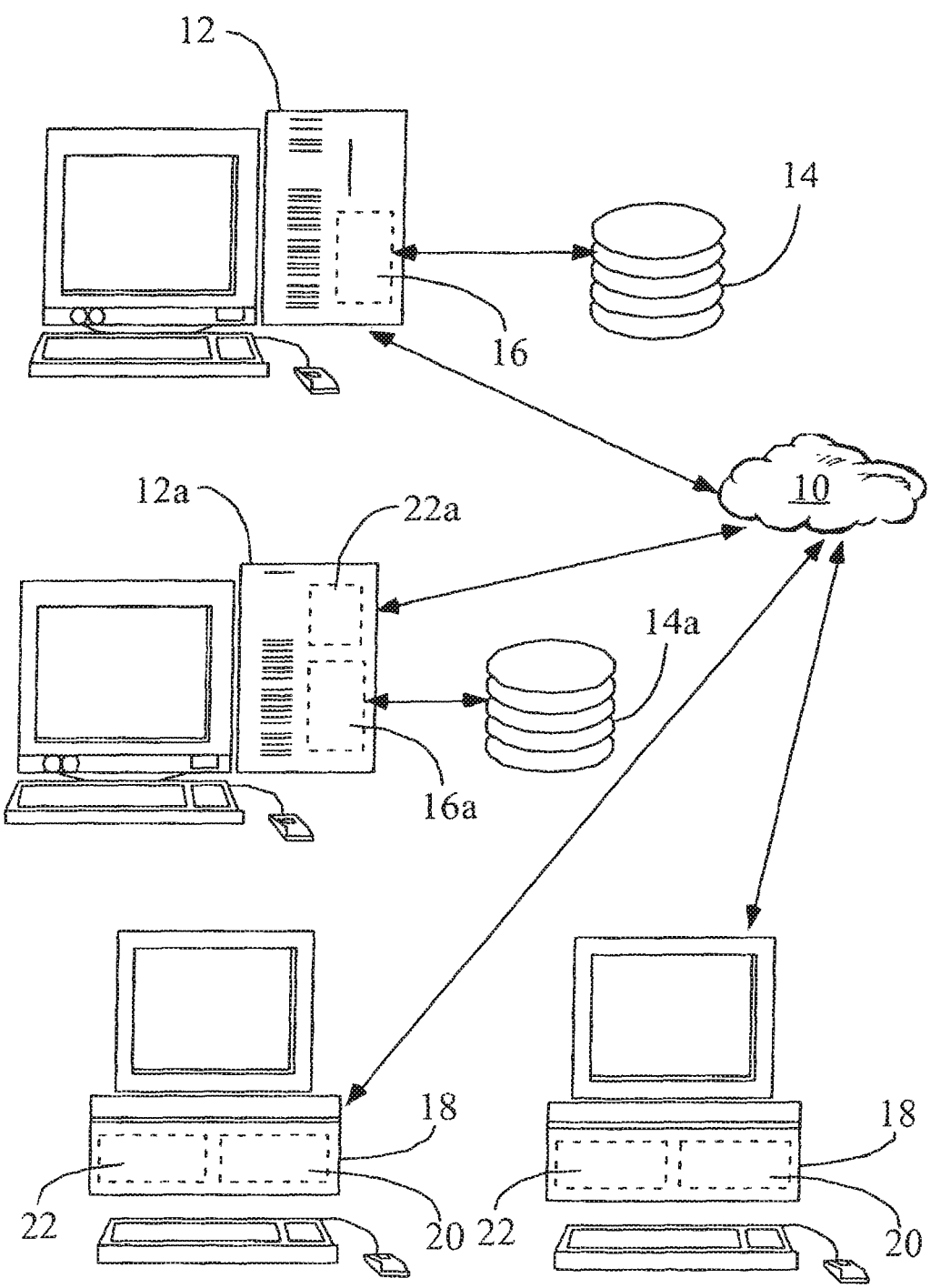
FIG. 2 is a schematic/block diagram of an alternative embodiment of the system shown by FIG. 1.

Such an embodiment is shown in FIG. 2. In this embodiment, the media source may be separate from the server 12, such as computer system 28 located at a broadcast media source, such as a radio station studio. Computer system 28 is a logical element in a data network, and can be physically collocated with the audio source, such as a computer resident in a radio station studio, or it can be remote from the audio source, such as a computer in a data center receiving digitized audio from a distant radio station.

This computer system 28 includes a source manager 30 which may be implemented in software or firmware. The source manager 30 comprises means for: receiving media data elements as they are generated by the audio and/or video source, formatting media data according to the requirements of server 12, buffer 14, and buffer manager 16; and, for transmitting that media data to server 12 as they are generated. Source manager 30 may, as part of such formatting, include means for digitizing, encoding, and packetizing the media data. Media data typically is generated in real time such as by a speaker talking into a microphone or by playing a CD.

Generally, computer system 28 transmits media data to server 12 in real time as the media data is generated. Buffering of media data might occur at computer system 28 for convenience of programming, but such buffering is incidental to the operation of the end-to-end system being described. Computer system 28 connects via the Internet 10, or other suitable data communications medium, to a server 12, wherein server buffer manager 16 receives the media data for input into the FIFO buffer 14 as described previously, and maintains the pre-determined number of data elements in the FIFO buffer.

Server 12, in turn, transmits the media data to one or more user computers 18, also as previously described.

Example Methods

Figure 3:
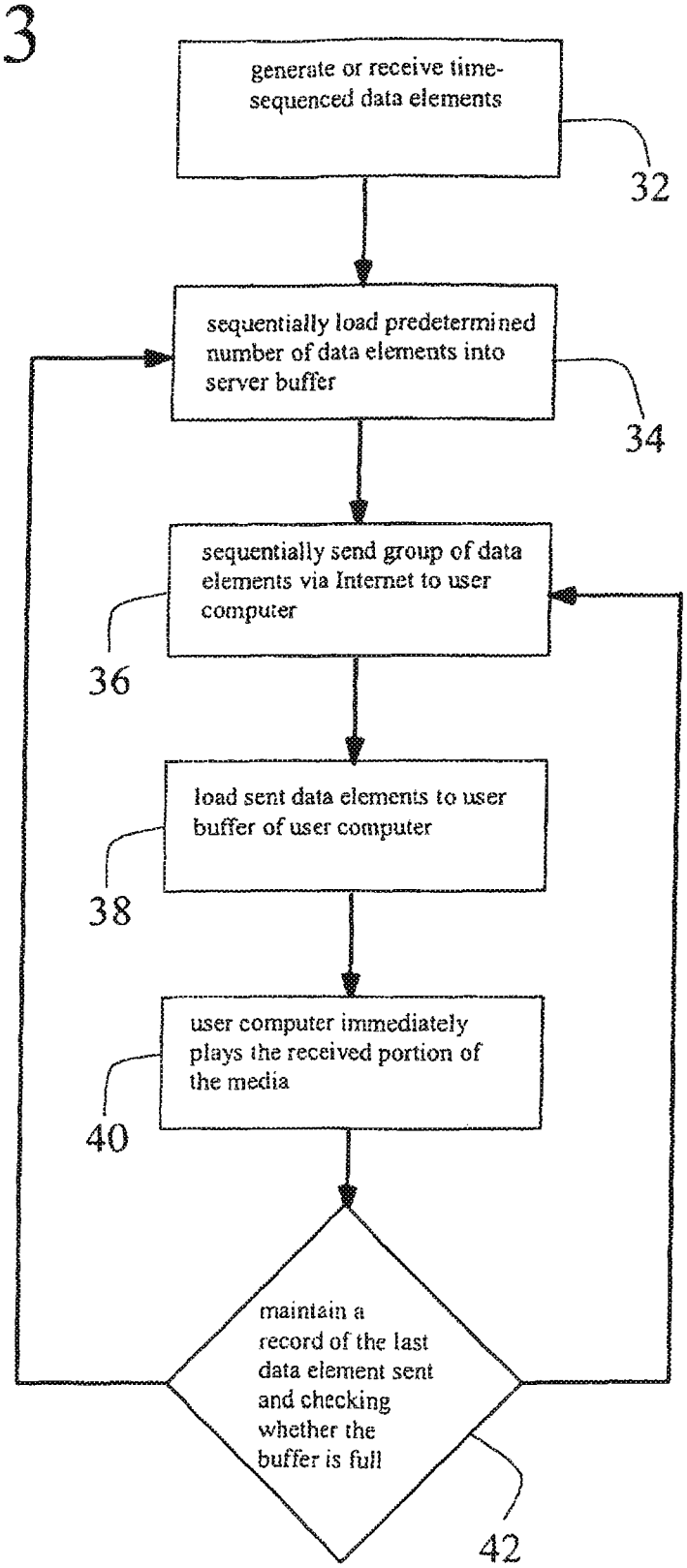
FIG. 3 is a flowchart illustrating a method employed in one embodiment of the present invention.

In another embodiment, shown in FIG. 3, the invention provides a method for distributing from a server via the Internet streaming media composed of a plurality of time-sequenced data elements.

Time-sequenced data elements are generated or received 32. Next, a predetermined number of the data elements is sequentially loaded 34 into a server buffer, which process of 32 and 34 continues indefinitely as long as there is media data available. Next, a group of the data elements is sequentially sent 36 via the Internet from the server buffer to a user computer connected to the Internet, more rapidly than they are played out by the user system. Upon receipt by the user computer, the sent group of data elements is loaded 38 into a user buffer associated with the user computer. The user computer immediately plays 40 the received portion of the media on the user computer. At 42, if the user buffer is not full, then additional data elements are sent to the user computer 36, again more rapidly than it is played out by the user system. And also at 42, if the user buffer is full, the system waits until new media data is delivered to the server buffer 34. This process is repeated until the entire media file is played at the user computer.

In another embodiments, the steps depicted in FIG. 3 could be modified as follows. A serial number is assigned 30 to each of the plurality of time-sequenced data elements. Next, a predetermined number of the data elements is sequentially loaded 32 into a source buffer, and a group of the data elements is sequentially sent 34 via the Internet from the source buffer to a user computer connected to the Internet. Upon receipt by the user computer, the sent group of data elements is loaded 36 into a user buffer associated with the user computer. Then, the user computer sends 38 to the source server the serial number of the last data element received by the user computer. The user computer immediately plays 40 the received portion of the media on the user computer. This process is repeated until the entire media file is played at the user computer. Unlike conventional buffer arrangements, audio begins to play on the user system as soon as the user connection is made to the audio source server. The user's buffer is built up while the audio is playing. Advantageously, the system and method of this invention create a faster than real time connection. That is to say, audio/video data is transmitted from the server faster than it is played out by the user system, thus building up audio/video data in the user buffer.

In another embodiment, the server is connected to the Internet and provisioned as initially described, and has available to it file based media data as the source material. The file based media data can be read by the server which can deliver media data elements to the server FIFO buffer to the same effect as if the data had arrived from a broadcast media source. As before, the server provides a buffer manager and a FIFO buffer, and provides a means for receiving the sequentially arranged media data elements from the file based media source and storing those data elements in the FIFO buffer.

The buffer manager comprises means for: receiving the media data; supplying media data in order to the FIFO buffer; supplying the FIFO buffer with a predetermined number of data elements; maintaining a pointer into the buffer for each user computer indicating the last media data element that has been sent to that user, thus indicating the next element or elements to be sent; and, once the FIFO buffer is full, deleting the oldest data element in the buffer as each new data element is received, said means arranged to maintain the predetermined number of data elements in the FIFO buffer. The server buffer manager, or a separate process on the server, or a process on another computer having access to the file based media data, provides for reading the media data file and making available to the FIFO buffer sequentially arranged media data elements. At least one user computer is connected to the server via the Internet. The user computer is associated with a media player software incorporating a user buffer and comprises means for receiving and storing a predetermined number of media data elements which are received sequentially by the media player, playing the data out sequentially as audio and/or video, and deleting media data elements from the buffer as they are played out. As data is played out, the next sequential data elements are received from the server in such a fashion as to approximately maintain the predetermined number of data elements in the user's buffer.

In another embodiment, the server is connected to the Internet and provisioned as initially described. The server buffer manager, or the media source, provides for sequentially numbering the media data elements. The server buffer manager does not maintain a pointer into the server buffer for each user. Instead, the media player buffer manager in the user computer maintains a record of the serial number of the last data element that has been received.

Via the use of standard data communications protocol techniques such as TCP, the user computer transmits a request to the server to send one or more data elements, specifying the serial numbers of the data elements. The server responds by sending the requested data elements, and depends upon the reliable transmission protocol to assure delivery. The user computer then continues with additional data requests for the duration of playing the audio/video material. In this manner, the user computer, not the server, maintains the record of the highest data element number stored in the user computer buffer. The media data will be transmitted to the user computer as fast as the data connection between the user computer and the server will allow. As before, the server provides a buffer manager and a FIFO buffer, and provides a means for receiving the sequentially numbered media data elements from a broadcast media source or a file based media source, and storing those data elements in the FIFO buffer. The buffer manager comprises means for: receiving the media data; supplying media data in order to the FIFO buffer; supplying the FIFO buffer with a predetermined number of data elements; and, once the FIFO buffer is full, deleting the oldest data element in the buffer as each new data element is received.

Such means is arranged to maintain the pre-determined number of data elements in the FIFO buffer. At least one user computer is connected to the server via the Internet.

The user computer is associated with a media player software incorporating a user buffer and comprises means for receiving and storing a predetermined number of media data elements which are received sequentially by the media player, playing the data out sequentially as audio and/or video, and deleting media data elements from the buffer as they are played out. As data is played out, the next sequential data elements are requested from the server in such a fashion as to approximately maintain the predetermined number of data elements in the user's buffer.

In yet another embodiment, the invention provides a method for distributing from a server via the Internet streaming media composed of a plurality of time-sequenced data elements. A predetermined number of the data elements are sequentially loaded into a FIFO buffer. Additional data elements continue to be received.

As each new data element is input to the buffer, the oldest data element is deleted from the buffer, maintaining in the buffer the same predetermined number of data elements. At the request of a user computer for connection to a media stream, a group of the data elements is sequentially sent via the Internet from the FIFO buffer to the user computer connected to the Internet. Upon being received by the user computer, the sent group of data elements is loaded into a user's buffer associated with the user computer.

The user's computer immediately begins to play the audio/video streaming media material. The server continues to send the next data elements in sequence until the contents of the FIFO buffer have been sent. The data elements are sent by the server as fast as the connection between the server and user computer will allow. Once the contents of the FIFO buffer have been sent to a user computer, as each new data element is received into the FIFO buffer it is immediately sent to the user computer in such a manner as to keep the user computer buffer full. The process repeats for substantially the entire time that the audio/video material is played.

Unlike conventional buffering systems, audio begins to play on the user system as soon as the user connection to the audio server is effected and a small amount of data has been transferred-conventional systems required many seconds of data. Audio/video media data is initially transmitted from the server more rapidly than it is played out by the user system, until the server buffer has been transferred to the user computer. The user's buffer is built up while the audio is playing, and can be restored if it is diminished by data transmission interruptions. Advantageously, the system and method of this invention afford faster data transmissions than the playback data rate of the media data. Audio/video data is transmitted from the server more rapidly than it is played out by the user system under conditions wherein the user's computer buffer is not full.

The audio/video data in the user buffer accumulates; interruptions in playback due to temporary Internet and modem delays are avoided. It should be realized that, although the invention has been described hereinabove in connection with a process wherein the server sends buffered media data to the user "as fast as the network connection will permit", it is adequate, as mentioned in this paragraph, that the buffered data be transferred from the server to the user at a rate faster than the playback rate.

Although the preferred embodiment utilizes a reliable transport mechanism to move data between the server and the user, alternative embodiments could incorporate this invention's buffering system in combination with an unreliable datagram-based transport mechanism.

Thus, it can be seen that the present invention provides a system and method for sending streaming media, such as audio or video files, via the Internet. Immediate playing of the media on a user's computer is afforded while reducing interruptions in playback due to Internet congestion and temporary delays. Delayed starts, heretofore required to provide protection against interruption, are avoided. Data loss due to interruptions in the receipt of media data by the media player can be recovered while the player continues to play out the audio or video material. If the interruptions are so severe as to deplete the user's buffer and stop the play out, the media player will begin to play out again as soon as the media player begins to receive media data without waiting to first build up the buffer.

Having thus described the invention in detail, it should be understood that various changes, substitutions, and alterations may be readily ascertainable by those skilled in the art, and may be made herein without departing from the spirit and scope of the invention as defined by the claims.

I claim:

1. A method for distributing over the Internet, from a server system to one or more user systems, a pre-recorded audio or video program stored in digitally encoded form on computer-readable media, the method comprising:

reading, by at least one computer of the server system, the pre-recorded audio or video program from the computer-readable media;

supplying, at the server system, media data elements representing the program, each media data element comprising a digitally encoded portion of the program and having a playback rate;

serially identifying the media data elements, said serial identification indicating a time sequence of the media data elements;

storing the media data elements in a data structure under the control of the server system;

receiving requests at the server system via one or more data connections over the Internet, for one or more of the media data elements stored in the data structure, each received request specifying one or more serial identifiers of the requested one or more media data elements, each received request originating from a requesting user system of the one or more user systems; and responsive to the requests, sending, by the server system, the one or more media data elements having the one or more specified serial identifiers, to the requesting user systems corresponding to the requests; wherein the data connection between the server system and each requesting user system has a data rate more rapid than the playback rate of the one or more media data elements sent via that connection;

each sending is at a transmission rate as fast as the data connection between the server system and each requesting user system allow;

the one or more media data element sent are selected without depending on the server system maintaining a record of the last media data element sent to the requesting user systems;

all of the media data elements that are sent by the server system to the one or more user systems are sent in response to the requests; and all of the media data elements that are sent by the server system to the requesting user systems are sent from the data structure under the control of the server system as the media data elements were first stored therein.

2. The method of claim 1 wherein the serial identifiers are sequential.

3. The method of claim 1, wherein the sending is via a reliable transmission protocol.

4. The method of claim 3, wherein the reliable transmission protocol is TCP.

5. A server system for distributing a pre-recorded audio or video program over the Internet to one or more user systems, the server system comprising:

at least one computer having a connection to the Internet;

a machine-readable, executable routine containing instructions to cause one of the at least one computers to read the pre-recorded audio or video program from computer-readable media, to supply, at the server system, media data elements representing the program, each media data element comprising a digitally encoded portion of the program and having a playback rate, to serially identify the media data elements, said serial identification indicating a time sequence of the media data elements, and to store the media data elements in a data structure under the control of the server system;

a machine-readable, executable routine containing instructions to cause one of the at least one computers to receive requests at the server system via one or more data connections over the Internet, for one or more of the media data elements stored in the data structure, each received request specifying one or more serial identifiers of the one or more media data elements, each received request originating from a requesting user system of the one or more user systems; and a machine-readable, executable routine containing instructions to cause one of the at least one computers to send, responsive to the requests, the one or more media data elements having the one or more specified serial identifiers, to the requesting user systems corresponding to the requests; wherein the data connection between the server system and each requesting user system has a data rate more rapid than the playback rate of the one or more media data elements sent via that connection;

each sending is at a transmission rate as fast as the data connection between the server system and each requesting user system allow;

the one or more media data elements send are selected without depending on the server system maintaining a record of the last media data element sent to the requesting user systems;

all of the media data elements that are sent by the server to the one or more user systems are sent in response to the requests; and all of the media data elements that are sent by the server system to the requesting user systems are sent from the data structure under the control of the server system as the media data elements were first stored therein.

6. The server system of claim 5 wherein the serial identifiers are sequential.

7. The server system of claim 5, wherein the sending is via a reliable transmission protocol.

8. The server system of claim 5, wherein the reliable transmission protocol is TCP.

9. A computer program product for distributing over the Internet from a server system comprising at least one computer to one or more user systems, a pre-recorded audio or video program stored in digitally encoded form on computer-readable media, the computer program product comprising a non-transitory computer readable storage medium having program instructions embodied therewith, the program instructions comprising:

instructions executable to cause one of the at least one computers to read the pre-recorded audio or video program from the computer-readable media, to supply, at the server system, media data elements representing the program, each media data element comprising a digitally encoded portion of the program and having a playback rate, to serially identify the media data elements, said serial identification indicating a time sequence of the media data elements, and to store the media data elements in a data structure under the control of the server system;

instructions executable to cause one of the at least one computers to receive requests at the server system via one or more data connections over the Internet, for one or more of the media data elements stored in the data structure, each received request specifying one or more serial identifiers of the one or more media data elements, each received request originating from a requesting user system of the one or more user systems; and instructions executable to cause one of the at least one computers to send, responsive to the requests, the one or more media data elements having the one or more specified serial identifiers to the requesting user systems corresponding to the requests; wherein the data connection between the server system and each requesting user systems has a data rate more rapid than the playback rate of the one or more media data elements sent via that connection;

each sending is at a transmission rate as fast as the data connection between the server system and each requesting user system allows;

the one or more media data elements sent are selected without depending on the server system maintaining a record of the last media data element sent to the requesting user systems;

all of the media data elements that are sent by the server to the one or more user systems are sent in response to the requests; and all of the media data elements that are sent by the server system to the requesting user systems are sent from the data structure under the control of the server system as the media data elements were first stored therein.

10. The computer program product of claim 9 wherein the serial identifiers are sequential.

11. The computer program product of claim 9, wherein the sending is via a reliable transmission protocol.

12. The computer program product of claim 11, wherein the reliable transmission protocol is TCP.

\* \* \* \* \*